United States Patent
Masurkar

(10) Patent No.: US 7,536,370 B2
(45) Date of Patent: May 19, 2009

(54) INFERENTIAL DIAGNOSING ENGINES FOR GRID-BASED COMPUTING SYSTEMS

(75) Inventor: Vijay B. Masurkar, Chelmsford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 309 days.

(21) Appl. No.: 11/427,298

(22) Filed: Jun. 28, 2006

(65) Prior Publication Data

US 2006/0242288 A1    Oct. 26, 2006

Related U.S. Application Data

(63) Continuation-in-part of application No. 11/284,672, filed on Nov. 22, 2005, now abandoned, which is a continuation-in-part of application No. 11/168,710, filed on Jun. 28, 2005, which is a continuation-in-part of application No. 10/875,329, filed on Jun. 24, 2004.

(51) Int. Cl.
*G06N 5/00* (2006.01)

(52) U.S. Cl. .......................................... 706/47; 706/45

(58) Field of Classification Search .................. 706/47, 706/45

See application file for complete search history.

(56) References Cited

U.S. PATENT DOCUMENTS

| | | | | |
|---|---|---|---|---|
| 6,006,016 A | * | 12/1999 | Faigon et al. | 714/48 |
| 6,108,616 A | * | 8/2000 | Borchers et al. | 702/183 |
| 2005/0235057 A1 | * | 10/2005 | Brodie et al. | 709/224 |
| 2007/0288418 A1 | * | 12/2007 | Pope et al. | 706/53 |

* cited by examiner

*Primary Examiner*—Wilbert L Starks, Jr.
(74) *Attorney, Agent, or Firm*—Marsh Fischmann & Breyfogle LLP; Kevin G. Shaw; Kent A. Lembke

(57) ABSTRACT

Disclosed herein is the creation and utilization of automated diagnostic agents that are used by service engineers to diagnose faults, errors and other events or conditions within a grid-based computing system, and provide a derived list of suspect root causes for the events. Related computerized processes and network architectures and systems supporting such agents are also disclosed. The automated diagnostic agents utilize software driven rules engines that operate on facts or data, such as telemetry and event information and data in particular, according to a set of rules. The rules engine utilize a neural network analysis environment to predict in accordance with the rules, facts and data found in the grid-based system to make probabilistic determinations about the grid. Particular memory allocations, diagnostic process and subprocess interactions, and rule constructs are disclosed.

18 Claims, 9 Drawing Sheets

INFERENTIAL DIAGNOSING ENGINES FOR GRID-BASED COMPUTING SYSTEMS

CROSS-REFERENCE TO RELATED APPLICATIONS

The present application claims priority from, and is a continuation-in-part of U.S. patent application Ser. No. 11/284,672, filed Nov. 22, 2005, now abandoned which in turn is a continuation-in-part of U.S. patent application Ser. No. 11/168,710, filed Jun. 28, 2005, which in turn is a continuation-in-part of U.S. patent application Ser. No. 10/875,329, filed Jun. 24, 2004. The disclosures of the foregoing U.S. patent applications are specifically incorporated herein by this reference in their entirety and assigned to Sun Microsystems, Inc., Santa Clara, Calif., assignee of the present invention.

BACKGROUND OF THE INVENTION

1. Field of the Invention

The present invention relates, in general, to computing methods for remotely diagnosing faults, errors, and conditions within a grid-based computing system. More particularly, the present invention relates to rule based processes and computing environments for probabilistic identification of potential root causes of faults, errors and other conditions within a grid-based computing system.

2. Relevant Background

Grid-based computing utilizes system software, middleware, and networking technologies to combine independent computers and subsystems into a logically unified system. Grid-based computing systems are composed of computer systems and subsystems that are interconnected by standard technology such as networking, I/O, or web interfaces. While comprised of many individual computing resources, a grid-based computing system is managed as a single computing system. Computing resources within a grid-based system each can be configured, managed and used as part of the grid network, as independent systems, or as a sub-network within the grid. The individual subsystems and resources of the grid-based system are not fixed in the grid, and the overall configuration of the grid-based system may change over time. Grid-based computing system resources can be added or removed from the grid-based computing system, moved to different physical locations within the system, or assigned to different groupings or farms at any time. Such changes can be regularly scheduled events, the results of long-term planning, or virtually random occurrences. Examples of devices in a grid system include, but are not limited to, load balancers, firewalls, servers, network attached storage (NAS), and Ethernet ports, and other resources of such a system include, but are not limited to, disks, VLANs, subnets, and IP Addresses.

Grid-based computing systems and networking have enabled and popularized utility computing practices, otherwise known as on-demand computing. If one group of computer users is working with bandwidth-heavy applications, bandwidth can be allocated specifically to them using a grid system and diverted away from users who do not need the bandwidth at that moment. Typically, however, a user will need only a fraction of their peak resources or bandwidth requirements most of the time. Third party utility computing providers outsource computer resources, such as server farms, that are able to provide the extra boost of resources on-demand of clients for a pre-set fee amount. Generally, the operator of such a utility computing facility must track "chargeable" events. These chargeable events are primarily intended for use by the grid-based computing system for billing their end users at a usage-based rate. In particular, this is how the provider of a utility computing server farm obtains income for the use of its hardware.

Additionally, grid-based systems must monitor events that represent failures in the grid-based computing system for users. For example, most grid-based systems are redundant or "self-healing" such that when a device fails it is replaced automatically by another device to meet the requirements for the end user. While the end user may not experience any negative impact upon computing effectiveness, it is nevertheless necessary for remote service engineers ("RSE") of the grid system to examine a device that has exhibited failure symptoms. In particular, a RSE may need to diagnose and identify the root cause of the failure in the device (so as to prevent future problems), to fix the device remotely and to return the device back to the grid-based computing system's resource pool.

In conventional operation of a grid-based computing system, upon an indication of failure, a failed device in the resource pool is replaced with another available device. Therefore, computing bandwidth is almost always available. Advantages associated with grid-based computing systems include increased utilization of computing resources, cost-sharing (splitting resources in an on-demand manner across multiple users), and improved management of system subsystems and resources.

Management of grid-based systems, due to their complexity, however can be complicated. The devices and resources of a grid-based system can be geographically distributed within a single large building, or alternatively distributed among several facilities spread nationwide or globally. Thus, the act of accumulating failure data with which to diagnose and address fault problems in and of itself is not a simple task.

Failure management is further complicated by the fact that not all of the information and data concerning a failure is typically saved. Computing devices that have agents running on them, such as servers, can readily generate and export failure report data for review by a RSE. Many network devices, such as firewalls and load balancers, for example, may not have agents and thus other mechanisms are necessary for obtaining failure information.

Further, the layout and configuration of the various network resources, elements and subsystems forming a grid-based system typically are constantly evolving and changing, and network services engineers can be in charge of monitoring and repairing multiple grid-based systems. Thus, it is difficult for a network services engineer to obtain an accurate grasp of the physical and logical configuration, layout, and dependencies of a grid-based-system and its devices when a problem arises. In addition, different RSEs, due to their different experience and training levels, may utilize different diagnostic approaches and techniques to isolate the cause of the same fault, thereby introducing variability into the diagnostic process.

In this regard, conventional mechanisms for identifying, diagnosing and remedying faults in a grid-based system suffer from a variety of problems or deficiencies that make it difficult to diagnose problems when they occur within the grid-based computing system. Many hours can be consumed just by a RSE trying to understand the configuration of the grid-based system alone. Oftentimes one or more service persons are needed to go "on-site" to the location of the malfunctioning computing subsystem or resource in order to diagnose the problem. Diagnosing problems therefore is often time consuming and expensive, and can result in extended system downtime.

When a service engineer of a computing system needs to discover and control diagnostic events and catastrophic situations for a data center, conventionally a control loop is followed to constantly monitor the system and look for events to handle. The control loop is a logical system by which events can be detected and dealt with, and can be conceptualized as involving four general steps: monitoring, analyzing, deducing and executing. In particular, the system or engineer first looks for the events that are detected by the sensors possibly from different sources (e.g., a log file, remote telemetry data or an in-memory process). The system and engineer use the previously established knowledge base to understand a specific event it is investigating. Next, when an event occurs, it is analyzed in light of a knowledge base of information based on historically gathered facts in order to determine what to do about it. After the event is detected and analyzed, one must deduce a cause and determine an appropriate course of action using the knowledge base. For example, there could be an established policy that determines the action to take. Finally, when an action plan has been formulated, it's the executor (human or computer) that actually executes the action.

This control loop process, while intuitive, is nonetheless difficult as it is greatly complicated by the sheer size and complicated natures of grid based computing systems.

Currently, inferential and deductive reasoning algorithms are being explored for use in various applications where root causes need to be inferred based on observed evidence. One such application is fault diagnosis of complex systems based on symptoms reported by various diagnostic monitors employing a variety of techniques to gather and normalize data for inferring the cause of the problem. It would also be useful if such algorithms could be used for performing the reverse analysis. For a known cause, one might want to find a possible resultant condition that can be construed as a "faulted" condition. Environments such as customer problem resolution in the field can benefit from "inter-causal" analysis, so effects of one cause can be determined on one or more other causes or the final result.

Unfortunately, inferential algorithms have not been adequately adapted for use in fault analysis of grid based computing systems. Thus, there remains a need for improved computing methods for assisting service engineers in remotely diagnosing faults, errors, and conditions within a grid-based computing that effectively takes advantage of inferential and deductive reasoning algorithms.

SUMMARY OF THE INVENTION

The present invention provides a method and system that utilizes automated diagnostic agent instances to perform inferential analysis of fault conditions in a grid-based computing system. A fault is an imperfect condition that may or may not cause a visible error condition, or unexpected behavior (i.e., not all faults cause error conditions). The system and method can utilize a service interface, such as may be used by a service engineer, to the grid-based computing system environment. The service interface provides a service engine with the ability to communicate with and examine entities within those computing systems, and the ability to initiate automated diagnostic agent instances that proceed according to preset diagnostic rules and metadata to analyze diagnostic related data according to inferential analysis algorithms to produce a derivative list identifying the probable root causes for a given fault condition.

In embodiments of the invention, the service interface provided enables a user, such as an administrator and/or service engineer, to configure telemetry parameters based on the diagnostic metadata, such as thresholds which in turn enable faults messages or alarms when those thresholds are crossed, to define diagnostic rules, and to remotely receive and make decisions based upon the telemetry data. Additionally, the service interface allows a user to monitor the diagnostic telemetry information received and initiate automated or semi-automated diagnostic agent instances in light of certain events.

An automated diagnostic agent instance according to embodiments of the present invention comprises a process initialized by a software script or series of scripts that operates within the grid-based system environment and, utilizing the operating system's capabilities, addresses the fault or other event by identifying probable causes of the event. The derived list event produced according to embodiments of the invention contains an identification of probable isolated faults, each identified fault record that is contained in the derived list is assigned a probability index (percentage) designed to assist a remote service engineer in making a decision on further actions to take. The probability index represents a "confidence level" for deriving a conclusion that the isolated fault is a root cause for the particular fault event being investigated. This probability index is determined by automated diagnostic agents in most preferred embodiments of the present invention utilizing Bayesian reasoning concepts to adapt a neural network construct termed herein an Event Belief Network.

Each derivative list-producing automated diagnostic agent provides one or more of three different types of analysis, namely, a derived list causal inference analysis, a derived list diagnostic inference analysis, and a derived list intercausal analysis.

The operation of any given automated diagnostic agent instance is predicated by a data store of rules, which define the logical relationships of all the resources, subsystems and other elements within the grid-based system and define what kind of metadata and telemetry data is created, monitored, and/or utilized in management of the grid-based system.

In certain embodiments of the invention, the rules in the database can include at least four different primary types of rules that will interact in the context of an automated diagnostic agent instance and within the framework and architecture. These primary types of rules include diagnostic process rules, agent action rules, granular diagnostic rules, and foundation rules. In such embodiments of the invention, the database can also include combinatorial rules that are defined based upon two or more rules of the four primary types. Further, the database can include derived rules for the primary rule types, which can comprise an explicit conjugation of rules representing advanced knowledge of one or more of the computing resources or grid elements.

Further, each rule in the rules database can also be categorized as either a cause (or "causal data element"), evidence (or "evidential data element"), or effect (or "effectual data element") according to how they were defined and tagged when they were initially created. Categorization of rules in this cause-evidence-effect context enables the compilation of metadata used to configure agents as appropriate for performing derived list causal inference analysis, derived list diagnostic inference analysis, and derived list intercausal analysis.

The inferencing engines utilized by diagnostic agents in embodiments of the present invention employ Bayesian reasoning. The Bayesian reasoning algorithms improve in accuracy as the amount of data increases. Preferred neural networks employed by the agent instances in producing derived lists according to embodiments of the present invention employ Bayesian reasoning.

According to preferred embodiments of the present invention, remote service engineers for the grid-based networks can utilize embodiments of the invention to isolate faults in an iterative manner. For example, the engineer can first initiate an agent process instance to perform neural network analysis in a bottom-up fashion where the analysis starts with the error/failure event as one or more effects and then calculates a few suspect causes from those known effects. These suspect causes would produce a derivative list event that includes a report identifying suspect root causes for the even and provides a probabilistic estimate from the Event Belief Network for each suspect cause where the estimate represents the likelihood that the particular cause is the root cause of the investigated error/failure event.

Thereafter, in such preferred embodiments the remote service engineers could initiate additional agent instances to perform diagnostic inference analysis to work back in top-down fashion to a probabilistic list of potential effects from one or more of the potential root causes identified in the bottom-up analysis. Such analysis produces a list of potential effects that may be likely to occur simultaneously (i.e., "co-symptoms" of a systemic problem) with the original investigated error/failure event. Additionally, from the potential root causes identified by the initial bottom-up analysis, one can utilize embodiments of the invention to perform intercausal analysis using evidential data as appropriate to further develop additional clues regarding problems within the grid.

In this regard, one such embodiment of the invention includes a method for producing a derived list of suspect root causes for fault events in a grid-based computing system. That method includes establishing a database containing rules describing the grid-based computing system according to causes, evidences, and effects. The method also includes establishing one or more agent scripts, with each script adapted to identify potential causes for particular fault events that may occur in the computing system. Each agent script references rules in the database to analyze metadata produced by the computing system. The method further includes receiving an indication of a fault event after it occurs in the computing system, and then initiating an automated diagnostic agent process instance in the computing system according to one of said agent scripts that is associated with the occurred fault event. The automated diagnostic agent instance process comprises a rules-based engine that establishes an event belief network that applies inferential logic to associate root causes with fault events by performing one or more analyses to construct a derivative list event according to the rules. The automated diagnostic agent instance process thereby provides a derived list that contains an identification of probable isolated faults with each probable fault having a probability index assigned thereto.

Additionally, another embodiment of the invention includes a computer readable medium having computer readable code thereon for producing a derived list of suspect root causes for fault events in a grid-based computing system. The code includes instructions for establishing an electronically accessible database containing rules describing the grid-based computing system according to causes, evidences, and effects. The code also includes instructions for establishing one or more agent scripts each adapted to identify potential causes for particular fault events that may occur in the computing system. Each agent script references the rules in the database to analyze metadata produced by the computing system. The medium further includes instructions for receiving an indication of a fault event after it occurs in the computing system and displaying the fault event to a user, and then enabling the user to initiate an automated diagnostic agent process instance in the computing system according to one of the agent scripts associated with the occurred event. The automated diagnostic agent process instance comprises a rules-based engine that establishes an event belief network that applies inferential logic to associate root causes with fault events. The engine performs one or more analyses to construct a derivative list event such that the automated diagnostic agent process instance thereby provides a derived list that contains an identification of probable isolated faults with each probable fault having a probability index assigned thereto.

Further, another embodiment of the invention includes a grid-based computing system adapted to provide partially automated diagnosis of fault events by producing a derived list of suspect root causes for said fault events, the computing system comprising a memory, a processor, a persistent data store, a communications interface, and an electronic interconnection mechanism coupling the memory, the processor, the persistent data store, and the communications interface. The persistent data store contains a database storing rules describing the grid-based computing system according to causes, evidences, and effects. The persistent data store further contains one or more diagnostic scripts each adapted to identify potential causes for particular fault events that may occur in the computing system, each agent script referencing the rules in the database to analyze metadata from the computing system. The memory of the grid-based computing system is encoded with an application that, when performed on the processor, provides a process for processing information. The process causes the computer system to perform operations of receiving an indication of a fault event after it occurs in the computing system, and initiating an automated diagnostic agent instance process in the computing system according to one of the agent scripts that is associated with the occurred event. The automated diagnostic agent process instance comprises a rules-based engine that establishes an event belief network that applies inferential logic to associate root causes with fault events. The engine performs one or more analyses to construct a derivative list event that contains an identification of probable isolated faults with each probable fault having a probability index assigned thereto.

Preferably, the embodiments are further characterized in that the engines perform Bayesian inferential logic of types selected from the group consisting of derivative list diagnostic inference analysis, derivative list causal inference analysis, and derivative list intercausal analysis. Most preferably, the embodiments include the initiating of two or more automated diagnostic agent process instances in succession, where these two or more instances utilize different ones of these types of said analyses whereby the derived list produced by a first of the two or more instances is used as an input for subsequent ones of the two or more instances.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing remote diagnosis of grid-based computing systems as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention.

The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Sun Microsystems, Inc. of Santa Clara, Calif.

The various embodiments of the invention having thus been generally described, several illustrative embodiments will hereafter be discussed with particular reference to several attached drawings.

DETAILED DESCRIPTION OF THE PREFERRED EMBODIMENTS

Figure 1:
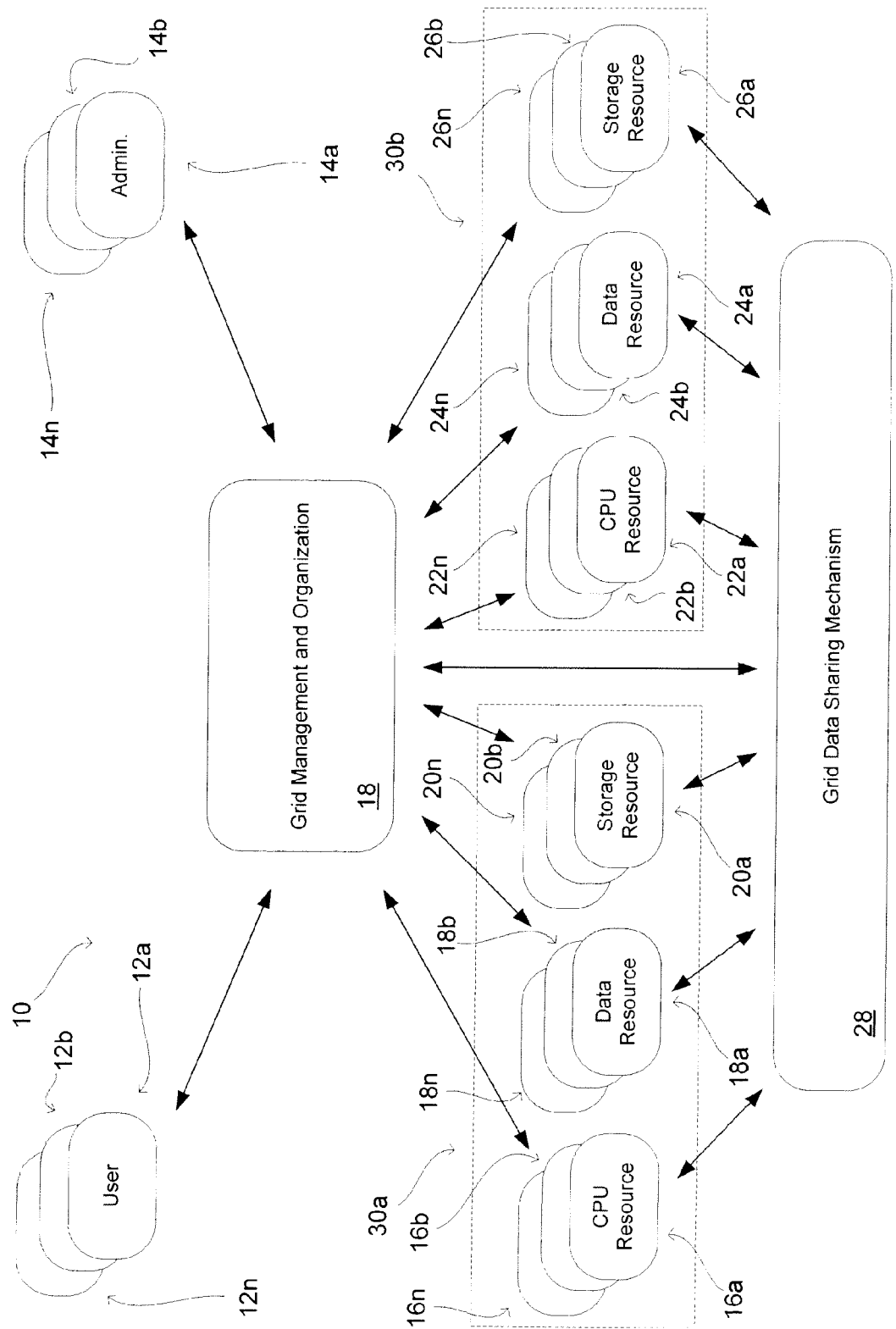
FIG. 1 is a schematic diagram depicting a conventional grid-based computing system.

To provide general context for describing the methods and systems for diagnosing with autonomic agents according to the present invention, FIG. 1 schematically depicts a grid-based computing system 10 of the conventional type. The grid-based computing system 10 may include one or more users 12a-12n and one more administrators 14a-14n. A grid management and organization element 18, which allocates and associates resources and subsystems within the grid, is in communication with users 12a-12n and with administrators 14a-14n. Also in communication with the grid management and organization element 18 is a first set of CPU resources 16a-16n (such as servers), a first set of data resources 18a-18n (such as databases) and a first set of storage resources 20a-20n (such as mass storage devices). The first set of CPU resources 16a-16n, data resources 18a-18n, and storage resources 20a-20n may be collectively referred to as a farm 30a, which could, for example, be located at a first location. A CPU resource could comprise a personal computer, a mainframe computer, a workstation or other similar type device, a data resource may be a database, a data structure or the like, and a storage resource may include magnetic tape storage, semiconductor storage, a hard drive device, a CD-ROM, a DVD-ROM, a computer diskette, or similar type device. Grid management and organization element 18 is also in communication with a second set of CPU resources 22a-22n, a second set of data resources 24a-24n, and a second set of storage resources 26a-26n, which may comprise farm 30b. The resources of farm 30b could be located at the first location with farm 30a, or located remotely at a second, different location. While two farms 30a and 30b are shown, it should be appreciated that any number of farms could be included in the grid-based computing system 10. Further, while CPU resources, data resources and storage resources are shown, other resources, including but not limited to servers, network switches, firewalls and the like could also be utilized.

Grid-based computing system 10 further includes a grid data sharing mechanism 28 that is in communication with the grid management organization element 18 and farms 30a and 30b as depicted. Additional resources and resource types may be added to a farm from an available resource pool (not depicted), and resources may also be subtracted from a farm which may go back into the resource pool. With such an arrangement, a user (e.g., user 12b) can access a CPU resource (e.g. CPU resource 22a) in farm 30a, while also utilizing data resource 24b and storage resource 26n. Similarly, an administrator 14a can utilize CPU resource 16n and storage resource 20a. Further, resources can be mixed and matched to satisfy load/bandwidth needs or concerns or to prevent down time in the event of a resource failure. Grid management and organization element 18 and grid data sharing mechanism 28 control access to the different resources as well as manage the resources within the grid based computing system 10.

Generally, events in a grid-based system that are watched for customers can be very generally sorted into two categories. The first category includes "chargeable" events, which are primarily intended for use by the grid-based computing system for billing end users for usage. In particular, this is how server farms operate under utility computing arrangements, and how the provider of the server farm determines what amount to charge customers for use of its hardware.

The other category of events represent non-chargeable events, such as failures, in the grid-based computing system. For example, when a device fails and is replaced by another device automatically to satisfy the Service Level Agreement ("SLA") requirements for the end user, one or more events would be generated, including a failure event. A typical self-healing architecture is expected to recover automatically from such a failure. However, it may be necessary to examine the device that exhibited failure symptoms. In particular, a service engineer would need to diagnose and identify the root cause of the failure in the device, to fix the device remotely and to return the device back to the grid-based computing system's resource pool.

Figure 2:
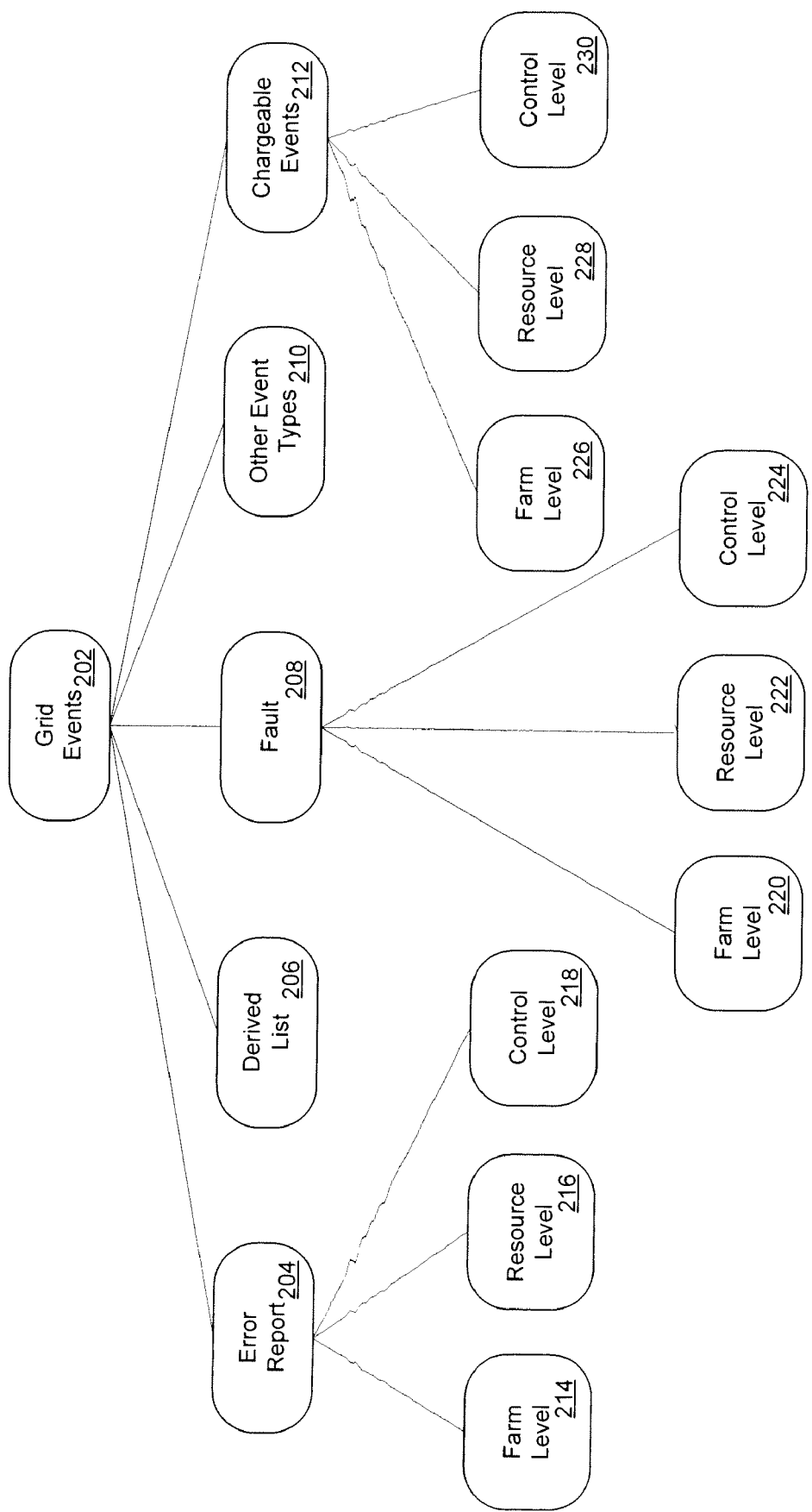
FIG. 2 is a schematic diagram depicting a logical grid event framework suitable for analyzing grid-based events in certain embodiments of the invention.

In this regard, embodiments of the invention can utilize a suitable grid event framework that defines a hierarchical arrangement of event information concerning a grid-based network into various categorizes designed to handle all event records of any type and any related data generated by the grid system. Referring now to FIG. 2, there is depicted an embodiment of a grid event framework within which the embodiments of the present invention may operate. The framework includes a root node 202, labeled grid events, which can be thought of as including the universe of all events for a grid-based system. The grid events can be classified into different event types, as depicted. These event types include an error report events 204, a derived list events 206, a fault events 208, chargeable events 212, and other events types 210. Error report events 204 (also referred to as error events) are generated upon the detection of an abnormal or unexpected condition, and are recorded in persistent storage (e.g. a file system) where they can be later accessed and reviewed as necessary.

A derived list event 206, otherwise referred to herein as a "derivative list event" or "DL," is one of the event types from the top grid event node. A DL is a type of event that can be one result of a diagnostic instance initiated by a RSE. In particular, the DL describes for one or more fault events, such as suspected failed devices, suspected root causes for the fault event(s)/failure(s) and indicates a likelihood value that each suspected root cause is actually the reason for the indicated alarm or event. Diagnostic instances may be launched by a RSE to produce such a derived list through the user interface after learning of a fault event. The produced DL is then used by the RSE for troubleshooting.

A Fault event 208 is an imperfect condition that may or may not cause a visible error condition (i.e., an unintended behavior). An unintended behavior linked to a fault could include, for example, a sudden drop in performance of a segment of a computing system covered by a specific set of virtual local area networks (VLANs), which performance then results in an error message being generated and sent to a fault management system of the grid. Fault management is the detection, diagnosis and correction of faults in a way to effectively eliminate unintended behavior and remediate the underlying fault. Automated diagnostic agent instances are types of processes according to the present invention that are adapted particularly for analysis and remediation of fault events, which may be stored and/or cataloged in a database as a list of faults for review or analysis by RSEs during grid troubleshooting performed in the conventional sense, or by automated service instances as described herein.

Chargeable events type 212 are as described above, and Other events type 210 refer to events which are not an error report, derived list, fault or chargeable event. Other event types 210 could include, for example, warnings (for crossing thresholds of certain parameters), conditions resulting from online backup activities, states of devices and subsystems resulting from planned shutdowns (for maintenance) and other administrative actions.

The fault event 208 type, error report 204 type, and chargeable event 212 types, further can be classified as depicted as falling into categories of three sub-types: farm level (220, 214, and 226, respectively), resource level (222, 216, and 228, respectively) and control level events (224, 218, and 230, respectively). Additional sub-categories can sort events in terms of their criticality level (e.g., critical, non-critical, and warning), or origin. Thus, events within these three particular event types, while not specifically depicted in FIG. 2, may be segregated further into these categories as appropriate. These various categories could be useful for organization and management, such as for priority handling or for presentation via the diagnostic telemetry interface to the user interface.

Similarly, categories 214-230 can be further segregated according to event origin. For example, farm level event category 214 may contain an element subcategory that enables events falling within category 214 to be further categorized according to the particular element of origin. A similar element subcategory could be included under other farm level event categories, such as farm level 220. Farm level categories could also have subcategories for identifying events according to server groups, and those server groups could be further split into sub-subcategories for particular servers. Similarly, resource level categories, such as resource levels 222 and 228, could have sub categories relating to devices or subsystems to denote origin of the events.

Derived list events 206 shares the top level of grid events 202 with the grid error events 204, the fault events 208, chargeable events and others. So, use of the DL is one of the several ways from which to use the grid-generated event information to troubleshoot or take other actions such as provisioning related ones.

For example, three primary farm level events that are monitored can include: when a farm is created, when a farm is deactivated and when a farm is dysfunctional. Similarly, resource level events can include various occurrences such as those itemized in Table 1 below.

TABLE 1

| Device Event | Definition |
| --- | --- |
| add | When a device (such as a server) is allocated |
| Avail | When a device is made available for usage; for example, a server allocated and brought online in the resource pool |
| Fail | When a device fails; e.g., a switch stopped forwarding data packets |
| Del | When a device is un-allocated; e.g. a directory server brought down for hardware maintenance |
| add and avail | When a device is restored; e.g. a firewall is reactivated and it has started filtering network traffic |

Examples of devices that can be resources include, but are not limited to, load balancers, firewalls, servers, network attached storage (NAS), and Ethernet ports. Other resources to be monitored include, but are not limited to, disks, VLANs, subnets, and IP Addresses.

Utilizing the selected event framework, such as the one depicted in and described with respect to FIG. 2, a user, such as a remote service engineer, is able to associate a resource level event with a farm event through the user interface, since each farm level event detail has a farm ID included in it and the resource level event also has an associated farm ID. For example, if a service engineer is trying to investigate a firewall failure event, the farm ID for that failed firewall device can be traced to the farm level events for that ID. Further, all the farm events for that farm can be examined to see if any one of them could have a possible relation to the failure of that specific firewall. Next, FML (Farm Markup Language), WML (Wiring Markup Language) and MML (Monitoring Markup Language) can help in farm-level configuration, physical connectivity, and monitoring analysis, respectively.

The event framework as depicted in FIG. 2 is desirable for grid-based computing environments because events can refer to the resource layer ("rl"), the control layer ("cl"), or the farm-level ("fl"). In a particular embodiment of the invention, it is preferred that all event messages created (also referred to as event records) have a common format, and include a time, a sequence number and details of the event. An example of a suitable format, shown in Extended Backus Nauer Form ("EBNF"), could include:

```
<event-message>:: = <utc-date-time> <sequence-info>
<event-info> " " <event-details>
<event-info>:: = "event" "=" <event> <event>:: =
                  "resource" | "control" | "farm"
<event-details>:: = <rl-event-desc> | <cl-event-desc> | <f-event-desc>
```

Events have a sequence number that uniquely identifies the event within a given fabric. The definition of a sequence is as follows (in EBNF):

<sequence-info>::="seq"<fabric-name>":"<sequence-id>

It will be readily appreciated by one of ordinary skill in the art that the event records that are applied to the event framework to identify one or more resources which caused the event in the grid-based computing system are generated by monitors and devices running within the grid based system. Data providers, as described and depicted below with respect to FIG. 3, for example, could accomplish monitoring at the host level, while grid level monitoring could be performed by a conventional monitoring system of the grid-based computing system itself. The typical monitoring system of a grid-based computing system performs several roles, which may include monitoring the health of equipment in the resource layer, monitoring the health of equipment in the control layer, providing a mechanism to deliver event logging throughout the infrastructure of the data center, and providing a mechanism to deliver event logging to a third party Network Management System ("NMS"). Embodiments of the present invention rely upon these monitoring and event logging capabilities of the data providers and the grid-based computing system.

Automated diagnostic agent instances according to the present invention are processes or instances spawned within the service interface architecture for a grid-based system, and these automated diagnostic agent instances employ rules engine logic. This logic follows a series of commands that operate on metadata, including telemetry and event information and data in particular, according to a set of rules previously established by an administrator. The automated diagnostic agent instances, when initialized by a service engineer, therefore execute commands according to the rules and based on the facts and data found in the grid-based system, and makes educated determinations about the grid. In certain cases, a particular automated diagnostic agent instance could take certain remedial actions, such as returning an offline or failed resource to a resource pool or rebooting a device.

A particular portion of automated diagnostic agent instances in preferred embodiments of the present invention is specifically adapted to produce derived list events. These "DL-agents" are instances started by the diagnostic kernel that are designed to address a subject fault by creating a "derived list" of suspect root causes that are likely to have led to a component fault, such as either at the grid system level, the farm-resource-control layer, or at the host component level. Such DL-agents can be spawned independently of or in parallel with other automated diagnostic agent instances by the diagnostic kernel at the discretion of the RSE.

In this regard, a diagnostic service instance started by a RSE via the diagnostic kernel could, for example a) addresses the subject fault and creates a "derived list" of suspected root causes for that fault, and b) fires off one or more diagnostic agent instances to remediate the faulted condition. At the same time, the instance typically would continue to send diagnostic telemetry information via the diagnostic telemetry interface to the diagnostic architecture's front-end.

Figure 3:
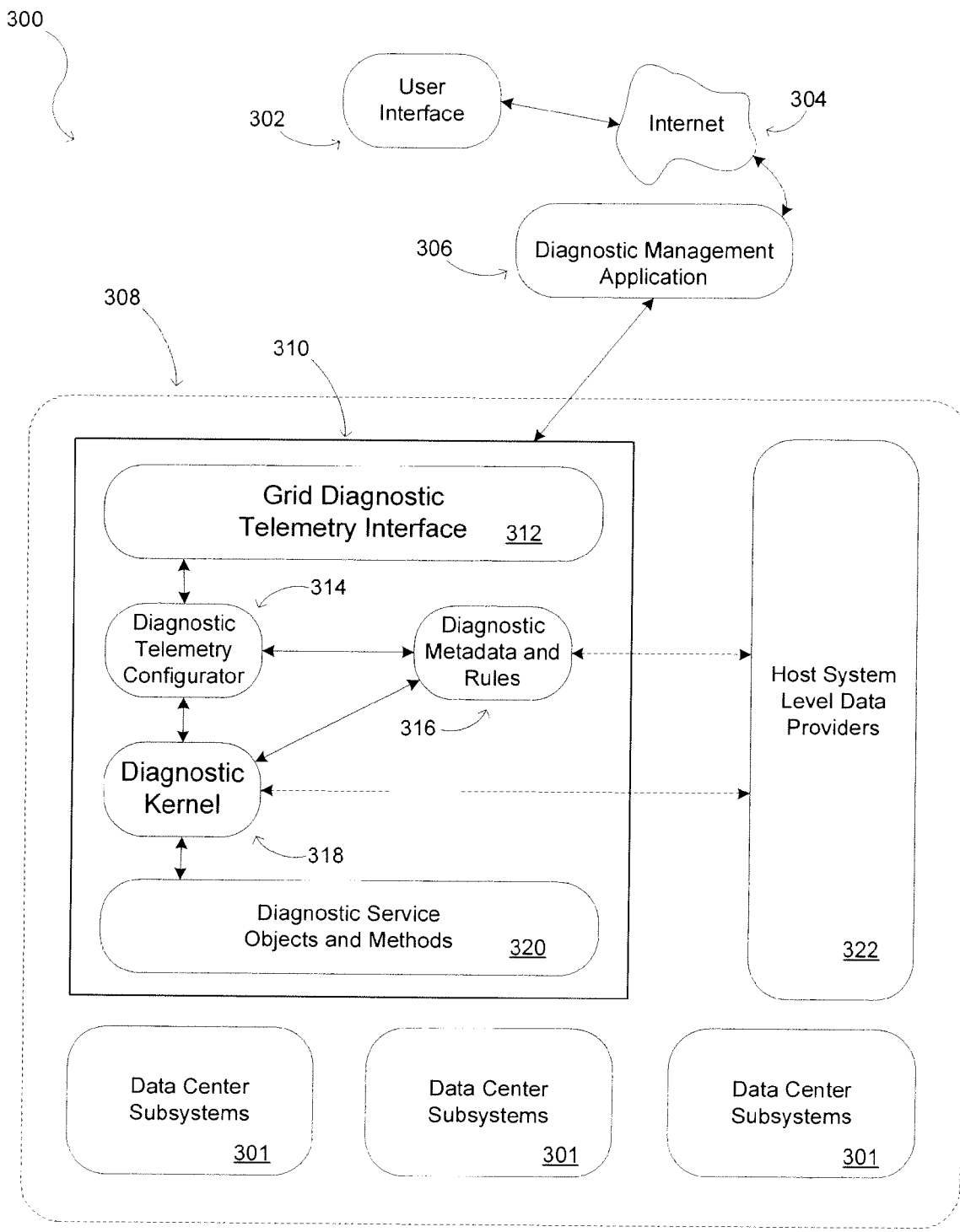
FIG. 3 is a block diagram of a particular embodiment of a suitable architecture for remotely diagnosing grid-based computing systems with automated diagnostic agent instances according to embodiments of the present invention.

FIG. 3 depicts an example of a suitable service interface architecture 300 of a grid-based computing system, such as the grid-based computing system 10 described in FIG. 1, which architecture 300 could be used to provide remote diagnosis capabilities via event reporting and automated diagnostic agent instances according to the present invention. Employing architecture 300, a service engineer can invoke a utility through the user interface 302 to remotely execute commands in the customer's grid environment and to remotely examine behavior of a web service (consisting of several related applications) or of a single application running in the grid environment. Preferably, the utility would allow the RSE to share the execution view and control with users (customers) who own the application environment within the grid. Information at the time of failure of any computing resource or entity is particularly helpful for troubleshooting purposes. In conventional operation of a grid-based computing system, the system is self-healing such that upon an indication of failure event, a failed device in the resource pool is replaced with another available device. Therefore, in a particular embodiment of remotely diagnosing a grid-based computing system, when a device fails, the failure details are exported to a control panel of the virtualized data center 308 where it thereafter can be reported to the appropriate service engineer via the Diagnostic Management Application 306 and the user interface 302. Employing such an architecture 300 according to the present invention enables a service engineer to invoke a utility through a suitable user interface to remotely execute commands in the customer's grid environment and to remotely examine behavior of a web service (consisting of several related applications) or of a single application running in the grid environment.

As described generally above, the user interface 302 (also referred to as a front-end) is accessed by a user desirous of performing diagnostic procedures, such as a network administrator or remotely located service engineer (i.e., a RSE). The user interface 302 provides communication across a network, e.g., Internet 304, to access a diagnostic management application 306 which is resident on the grid-based computing system. Preferably, communication across the Internet is performed using a secure tunnel architecture to maintain integrity and privacy of client data. The user interface 302 as depicted allows a user in one location to communicate with any number of grid-based computing systems located remotely from the user. The user interface provides the service engineer with the ability to focus in on a customer's location, a customer's grid-based computing system and the associated event framework to receive and review relevant events, alarms and telemetry information. The user interface further allows the user to select the primary grid-based computing system entities, such as farm or resource, or a subsystem within a farm or resource, for examination. As such, the user interface can display trouble areas and display events that are critical (or otherwise notable), and generally enable the user to sort, filter, and review data, draw conclusions, and configure and launch automated diagnostic agent instances as described herein.

Using the interface, the user is able to collect information from the grid-based computing system pertaining to server farm and resource level events and error conditions, configuration information and changes, utility reports at farm and resource levels, status information, and asset survey and asset "delta" (i.e., change) reports. In operation, for example, a support line of RSEs can be contacted by a client of the grid-based network, such as via telephone, email, web client, etc., for assistance in diagnosing and/or remedying a particular network fault or other event. A RSE in response would then utilize the user interface 302 to address the inquiry of the client by examining the status of the particular farms, resources, and subsystems implicated by the event.

In conventional operation of a grid-based computing system with self-healing abilities, upon an indication of failure, a failed device in the resource pool is replaced with another available device. Therefore, it should be appreciated that when a device fails, failure details are exported to a virtualized data center control panel, which ultimately leads to information concerning the failure being reported to a service engineer. As noted above, a service engineer faced with a troubleshooting task in light of a failure event needs to understand the high level abstract view presented by the grid-based computing system and its allocation/un-allocation/reallocation and other provisioning abilities, as well as be able to drill down to collect information from the single resource level, such as for a specific server or a network switch. Thus, in embodiments of the invention, the user interface provides a service engineer with the capability to lookup the status of various resources linked to an event, and then obtain and review any telemetry data and metadata produced by the grid-based system in relation to the resources and event.

Additionally, as will be described further below, the user interface also enables a user, such as an administrator and/or service engineer, to configure telemetry parameters based on the diagnostic metadata, such as thresholds which in turn enable faults messages or alarms when those thresholds are crossed, to configure diagnostic rules, and to remotely receive and make decisions based upon the fault messages, alarms, and telemetry data. Further, the user interface allows a user to monitor the diagnostic data and information received and initiate automated or semi-automated diagnostic services instances in light of certain events, and, in particular, to launch automated diagnostic agent instances and processes that automatically collect information and address problems raised by such events, such as by collecting and reviewing event-related telemetry information and data to produce a derived list of potential root causes of events as described herein.

In certain embodiments of the invention, the user interface for the remote service engineer can be adapted to provide a simultaneous, side-by-side, or paneled view of the structure and devices of a selected farm along with diagnostic, status, and/or telemetry data concerning those devices. The selection and implementation of one or more of such views is not critical, and could be made in consideration of ergonomic, usability and factors by one of ordinary skill in the art.

Co-pending and co-owned U.S. patent application Ser. No. 10/875,329, the specification of which is herein incorporated by reference in its entirety, discloses a series of suitable user interface screens that could be provided by such a user interface to enable a service engineer user to drill down through a representation of the grid-based system to identify affected resources, subsystems, etc., for a given fault or other event. In this regard, a service engineer could be permitted to select a company (customer) from a list of companies, and then be provided with a list of grids that are being managed for that company. If a particular fault event has occurred that is affecting one of those grids, then, for example, an indication (such as color coding or a message) can be provided. The service engineer can thereby click on the desired/indicated grid to see all the events and alarms relating to that grid, and click to drill down further to determine the cause of the event. When the user clicks on the highlighted grid, the user is taken to a screen showing the farms within the selected grid, which farms in turn can be provided with similar indications. Alternatively, the service engineer can be provided with a screen that indicates the occurrence of faults or events of interest for the selected farm. From either of these screens, particular resources and devices relating to the event/farm can be accessed. The user can thereby access information concerning the subsystems included in the selected network resource. This interface thus enables a service engineer to go through a given farm level-by-level in order to diagnose the cause of the event or alarm, and decide upon a course of action.

In a particular embodiments of the user interface, additional "drill down" information may be made available such as the farm-resource-control layer, or device, or subsystem related telemetry data, which may prove useful in performing diagnostic evaluations. Corresponding telemetry data viewing may also be enabled at the respective level of the user interface. For example, when looking at farm-resource-control layers, telemetric parameters at that level may be particularly relevant. Similarly when focused on a device, such as a directory server, telemetry data pertaining to commands such as "sar" (system activity report) or "vmstat" (virtual memory statistics) may be found to be more useful.

The diagnostic management application 306 as depicted in FIG. 3 functions as a web server that provides information to the user interface 302 from the grid based computing system. A Data Center Virtualization architecture 308 for the grid-based computing system as depicted can be used to manage the grid-based computing system as a single system instead of as a collection of individual systems (such as Data Center Subsystems 301). A typical data center virtualization architecture provides intelligence, management, and control features to maintain a highly integrated Ethernet environment that manages configuration and activation of resources, monitoring of resource failures and flexing and recovery of resource usage, and image and physical management of the various resources that comprise the grid system. In this regard, Data Center Virtualization architecture 308 would be a means to enable the grid-based system to, for example, define one or more logical server farms from among the total pool of available resources.

Architecture 300 as depicted in FIG. 3 also includes a grid diagnostic core 310 for supporting embodiments of the invention. This core 310 resides in the architecture and includes a Grid Diagnostic Telemetry Interface 312, a Diagnostic Telemetry Configurator 314, a repository of Diagnostic Metadata and Rules 316, a Diagnostic Kernel 318, and a Diagnostic Service Objects and Methods software library 320. Diagnostic Kernel 318 is used to facilitate the fault management at the individual nodes or resources within the grid-based computing system by the spawning and managing of various diagnostic processes and subprocesses, including automated diagnostic agent instances as will be described in more detail below. The Grid Diagnostic Telemetry Interface 312 is in communication with the Diagnostic Telemetry Configurator 314, and is used to provide grid related data to the Data Center Virtualization architecture 308. The Diagnostic Telemetry Configurator 314 in turn is in communication with the Diagnostic Metadata and Rules 316 and with the Diagnostic Kernel 318, and is used to provide metadata parameters to one or more Data Providers 322, and parameters and rules to Diagnostic Kernel 318. These parameters and rules are part of databases or database files defined and populated by the user through the user interface 302, and these parameters and rules define various aspects of the operation of core 310 and any instances of automated diagnostic agent instances that it creates, as described in more detail below.

Data Providers 322 are typically utilized in grid-based systems to supply data from host systems for resolving problems at the host level, and often can therefore be considered resources within the grid domain. Such data providers can include systems statistics providers, hardware alarm providers, trend data providers, configuration providers, field replaceable unit information providers, system analysis providers, network storage providers, configuration change providers, reboot providers, and the like. The Diagnostic Metadata and Rules 316 is in communication with Data Providers 322, and is used by an administrator to configure telemetry parameters (based on the diagnostic metadata) such as thresholds that in turn enable alarms when the thresholds are crossed by data coming from the Data Providers 322. These Data Providers 322 supply relevant information into the service instances initiated by the Diagnostic Kernel 318 as appropriate, and utilize metadata whose parameters are configured by administrators through the user interface 302 via the Diagnostic Telemetry Configurator 314.

As depicted, the Diagnostic Kernel 318 is also communicatively linked with a library of Diagnostic Service Objects and Methods software 320, and is used to launch diagnostic service instances that receive relevant information from Data Providers 322. According to preferred embodiments of the invention, a diagnostic service instance started by the Diagnostic Kernel 318 comprises an automated diagnostic agent instance adapted to produce one or more derivative list events. Such agent instances are referred to herein as DL-agents. Diagnostic Service Objects and Methods 320, and that DL-agent is designed to address the faulted condition by producing a derivative list. The Diagnostic Kernel 318 also sends diagnostic telemetry information via the grid Diagnostic Telemetry Interface 312 to the user interface 302.

The present methods and systems for remotely diagnosing grid-based computing systems thus utilize a suitable architecture such as architecture 300 to provide a service interface to the customer's grid-based computing system environment, and with it the ability to examine entities within those computing systems and the ability to initiate automated diagnostic procedures (using diagnostic metadata and rules) or collect diagnostic related data for analysis and resolution of the problem. The architecture described with respect to FIG. 3 enables the use of diagnostic telemetry information and data to facilitate the fault management at the individual nodes within a grid data center while also managing faults from within the grid architecture domain. According to architecture 300, a RSE will be able through the front end, preferably remotely via a secure tunnel architecture over the Internet, to configure telemetry parameters (based on the diagnostic metadata) such as thresholds which in turn enable alarms when thresholds are crossed, to receive and make decisions on the telemetry data, and to monitor the diagnostic telemetry information received.

As described further below, automated or semi-automated diagnostic service instances can be initiated from the front end interface as well.

In this regard, RSEs are assisted in remotely identifying problems by deploying automated diagnostic agent instances according to the methods and systems of the invention, which automated diagnostic agent instances identify causes or potential causes for problems, and, in certain instances, provide automated assistance to the user for resolving the problem. Alternatively, the automated nature of the diagnostic agents can be disabled to instead provide the service engineers with, for example, suggested step-by-step commands for diagnostic processes for generating a derived list of suspect causes that are candidates for causing or leading to a subsystem fault—either at the grid-based computing system farm-resource-control layer or at the host subsystem level. This alternative option would thereby allow a RSE to step through the diagnostic algorithm embodied by a particular automated diagnostic agent instance and its corresponding scripts and subprocesses.

All automated diagnostic agent instances according to embodiments of the present invention, including DL-agents, generally are comprised of a series of tasks, such as a script of commands or function calls in an operating system language or object code language, invoked automatically via other scripts or initiated by a RSE for deciding on diagnosis for a section of a data center under question when a particular event is encountered. Each such agent can be considered stateless in that it will not pass on information from one instance to the next instance of the same or another agent. The operation of any given automated diagnostic agent instance, however, is predicated by a data store of rules (e.g., a database of rules, such as diagnostic metadata and rules 316 in architecture 300) that define the logical relationships of all the resources, subsystems and other elements within the grid-based system and define what kind of metadata and telemetry data is created, monitored, and/or utilized in management of the grid-based system.

The DL events according to the present invention are products of several parallel phases of information gathering and analysis performed by various automated processes and subprocesses that comprise a DL-agent instance. The operation and interaction of these processes and subprocess is depicted in FIG. 4, which provides and schematic overview of the creation of a derived list for fault event records according to one preferred embodiment of the present invention.

Figure 4:
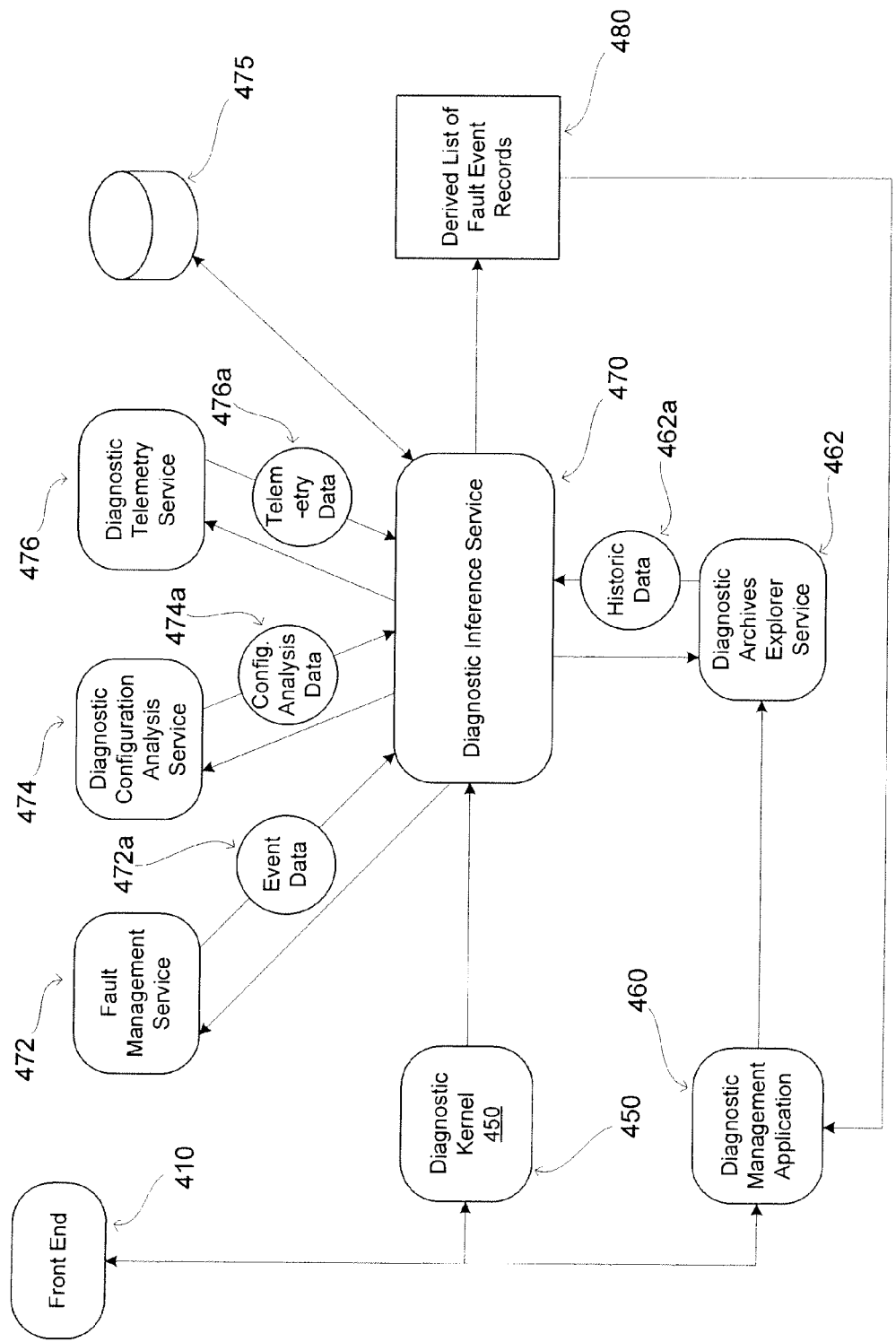
FIG. 4 is a logic map of related processes and information flows for a diagnostic agent instance adapted to produce a derivative list.

As depicted in FIG. 4, a RSE can use the front end 410 to interact with the Diagnostic Management Application 460 and diagnostic kernel 450 of the architecture (equivalent to kernel 318 as depicted in architecture 300 of FIG. 3) to spawn a inferencing engine for a new instance of a particular automated diagnostic agent that is adapted to produce a derived list (hereinafter also referred to as a "DL-agent"). This DL-agent comprises various constituent processes, including a main inferencing engine process named the diagnostic inference service (DIS) process 470 that manages operation of the DL-agent and various subprocesses that it spawns within the workspace for data gathering. In particular, a first service subprocess deployed by the DIS process 470 for the DL-agent is a Fault Management Service (FMS) subprocess 472 that is adapted to generate events records of event data 472a for the user-requested target domain relating to the fault event(s) being analyzed by the current instance of the DL-agent. This event data 472a, for example, could be stored in an event record database (not pictured) associated with the grid-based network that centrally stores fault records and other event records relating to the grid.

The DIS process 470 also deploys a Diagnostic Configuration Analysis Service (DCAS) subprocess 474 to analyze FML, FEML, WML and MML files of subsystems and devices related to the subject fault to generate configuration analysis data 474*a* pertaining to a given fault event being analyzed. Like event data 472*a*, configuration analysis data 474*a* could be stored in a grid configuration database (not pictured) that centrally stores information concerning the current configuration of the grid-based network.

A third service subprocess spawned by the DIS process 470 is the Diagnostic Telemetry Service (DTS) subprocess 476. This subprocess gathers context-driven telemetry data 476*a* from the prevailing telemetry agents and databases present in the interconnect infrastructure of the grid network's architecture. The DTS subprocess 476 manages large amounts of telemetry data as many grid network's can comprise tens of thousands of nodes in a single subnet.

Archived diagnostic data, historic data 462*a*, is analyzed by a Diagnostic Archive Explorer Service (DAES) subprocess 462 that is spawned automatically by the DMA 460 to work in conjunction with the DIS process 470. The purpose of the DAES subprocess is to generate related historic data set of significance by identifying corresponding event data from diagnostic archived historic databases for the grid network. Typically, all fault data on every farm element, resource device or subsystem and control component would be shipped through the diagnostic telemetry interface to such a back-end historical database (not depicted) on periodic basis for retrospective analysis. This historic fault data typically would be associated with respective farm IDs, device IDs, times of failure, and other like levels of detail associated with each record.

As depicted, the DIS process 470 communicates requests for data to the various service subprocesses 462, 472, 474, and 476, and these service subprocesses feed the requested data back to the DIS process 410. After the data is collected by the various subprocesses of the DL-agent instance, the DIS process 470 correlates all the generated data and uses the precompiled rules, including cause-evidence-effects meta data 475 (as described in more detail below), to produce a derived list 480 containing a possible set of fault event records using a probability based algorithm. These records can be used by a service engineer to make an informed decision.

This derived list 480 is then communicated to the DMA 460 as a derived list event, which is viewable by the RSE by via the front end 410. At this time, the DL-agent could terminate, causing the DIS process 470 and its component service subprocesses to exit, preferably after logging all the appropriate winding-down steps in their respective activity logs.

The derived list event produced according to the process depicted in FIG. 4 contains an identification of probable isolated faults, each identified fault record that is contained in the derived list is assigned a probability index (percentage) designed to assist a RSE in making a decision on further actions to take. The probability index represents a "confidence level" for deriving a conclusion that the isolated fault (i.e., linkage of cause to effect) is a root cause for the particular fault event being investigated. This probability index is determined by the DIS of DL-agents in most preferred embodiments of the present invention utilizing Bayesian reasoning concepts to adapt a neural network construct termed an Event Belief Network ("EBN").

The DIS process for each DL-agent may be configured to provide one or more of three different types of inferential analysis to a RSE activated through the front end, namely, derived list causal inference ("DLCI") analysis, derived list diagnostic inference ("DLDI") analysis, and derived list intercausal ("DLI") analysis. These three types of different analyses that may be utilized in producing a DL are discussed below.

Figure 5:
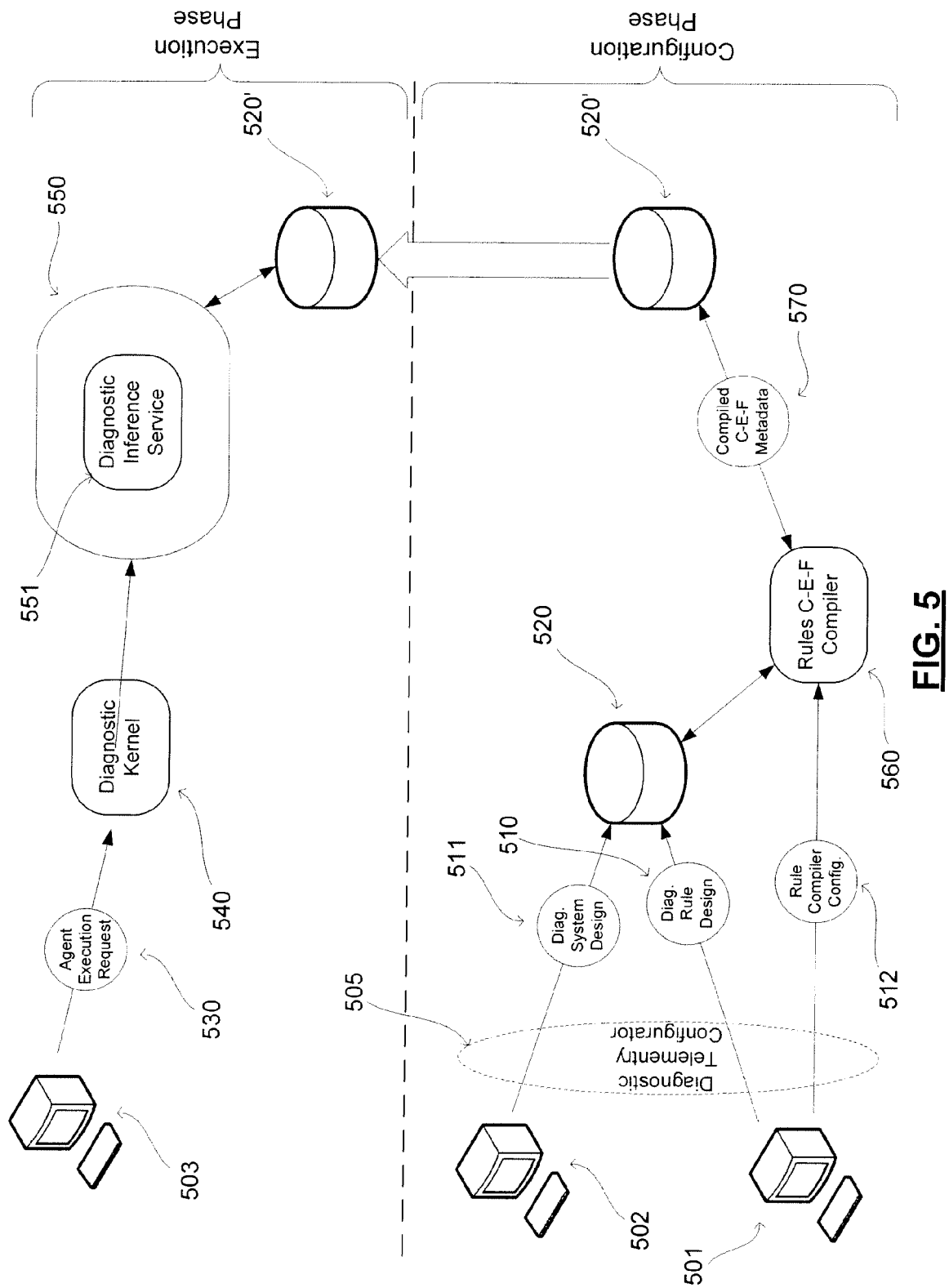
FIG. 5 is a schematic diagram representing a process according to embodiments of the present invention by which automated diagnostic agent instances utilize rules and metadata configured prior to execution in order to run automatically within a grid-based system.

FIG. 5 depicts how diagnostic agents, also referred to herein as diagnostic service instances, are processes that are largely dependent upon a set of rules, established and controlled via the diagnostic telemetry configurator (labeled 314 in FIG. 3), that are particular to a given grid-based network. As discussed above, the diagnostic agent instances may be launched on demand by a RSE and will run in at least partially automated fashion as described below to, for example, isolate down to a suspected device or, produce a derived list of suspected areas of failed subsystems. As illustrated in FIG. 5, a diagnostic rules execution environment 550 will be created for each automated diagnostic agent instance, including DL-agents. Each instance of a DL-agent will comprise a DIS process 551 spawned by the diagnostic kernel daemon 540 in response to an "initiate DL-agent" command received from a RSE via the user interface. As noted above, this DIS process is the main process that governs an entire instance of a particular automated diagnostic agent instance adapted to produce a DL from initialization to completion. The DIS process 551 in turn will spawn several subprocesses that are tasked with specific functions (such as those described in detail above with respect to FIG. 4). The DL-agents, such as with the help of APIs of the diagnostic kernel 540, accesses the rules metadata database (Rdb), to corroborate causes, evidences and effects dumped in the Rdb's files, that are the intermediate files of the C-E-F rules compiler as described further below with respect to FIG. 5. This is based on the assumption that cause-evidence-effect tags for the rules' components were entered when the rules were first defined, created and stored in the Rdb.

As described above with respect to FIG. 4, when the particular automated diagnostic agent instance is a DL-agent that is particularly adapted to produce a derived list of suspected root causes for a fault event, the DIS process 551 in FIG. 5 will cause various subprocesses (not depicted in FIG. 5) to be spawned in the execution workspace 550, which subprocesses perform tasks associated with the derived list analyses, including a FMS subprocess, a DCAS subprocess, a DTS subprocess, and a DAES subprocess. These subprocesses inter-operate as described above with respect to FIG. 4 during the "execution phase" of DL-agent use according to preferred embodiments of the present invention.

Rules as utilized by the automated diagnostic agent instances according to embodiments of the invention are a special kind of object produced by rule designers for the diagnostic metadata & rules repository. The repository for the diagnostic metadata and rules, as depicted in FIG. 3, should be maintained minimally separated from the diagnostic execution environment (diagnostic kernel, instances, etc.) to enable interaction of the diagnostic kernel and individual instances of the spawned engine processes with the repository during execution. The rules in the repository are defined as software objects. During execution of an automated diagnostic agent instance according to embodiments of the present invention, relevant rules are utilized by a diagnostic agent instance for fault diagnosis and isolation at various points throughout a given script. According to embodiments of the invention, there are at least four different primary types of rules will interact in the context of an automated diagnostic agent instance and within the framework and architecture described above, namely diagnostic process rules ("DPR"), agent action rules ("AAR"), granular diagnostic rules ("GDR"), and foundation rules ("FR"). During execution of an autonomous diagnostic agent according to embodiments of the previous invention, DPR, AAR, FR and GDR are utilized by a diagnostic agent instance for fault diagnosis and isolation.

With regard to DL-agent instances in particular, each rule in the rules database can also be categorized as either a cause (or "causal data element"), evidence (or "evidential data element"), or effect (or "effectual data element") according to how they were defined and tagged when they were initially created. The following paragraphs provide description and examples of the primary rule types and how rules of those different types can be parsed and how parsed elements can be categorized into causal, evidential and effectual data elements. As will better understood after the detailed discussion below, such categorization of rules for DL-agents in this cause-evidence-effect context is used to create rules C-E-F metadata and the EBN that are used for derived list causal inference analysis, derived list diagnostic inference analysis, and derived list intercausal analysis.

DPR are specific to a product, which may be a device or subsystem in the data center. They are defined at design time, a priori, by product design and service personnel who have successfully diagnosed the product. A DPR can comprise, for example, a rule establishing standard procedures for diagnosing the booting of a particular brand and model of web server as provided by the producer of the web server. These standard procedures could dictate, for example, that you first check the memory, then check certain processes, and so on. This exemplary DPR could be considered to have then a base condition that is the cause in this context (i.e., installed server, unbooted), and a related execution component (e.g., boot command) would comprise evidential data with an anticipated effect (e.g., a booted server).

AAR are consumed at the execution level and are organized according to the individual discrete diagnostic steps to which they apply, and also according to the execution category to which they belong. An AAR is a rule that specifies a course of action associated with the completion of a particular diagnostic step. Execution categories fall into setting various levels of errors (critical, non-critical and warning), re-routing execution and exiting under exceptional conditions, etc. AAR, for example, can assist an automated diagnostic agent instance in deciding whether to fault isolate a device, whether to unblock a request representing a grid action (that is not yet completed), to go parse and examine a segment manager log, to analyze particular farm configuration markup represented by FML or wiring connectivity represented by WML, and generally to decide which step to perform after completing a particular step. In this regard, in the case of a resulted exception condition comprising a cause according to the present context, the evidence would be the level of error while the effect could be the triggering of an exception that is sent to the diagnostic management application.

GDR are similar to DPR except that they are specific to a device or subsystem and are more granular compared to DPRs. For example, within a server device (governed by a DPR), one or more GDR may be specifically defined to apply to, for example, a storage sub-device, or to a set of sub-devices which are central processing units. GDRs typically focus on diagnostic characteristics of a sub-device and its finer components. A single DPR at a device or subsystem level may, in fact, activate multiple GDRs depending upon the path of the diagnostic agent execution and predicate results at decision points within that patent at sub-device or sub-sub-device levels. For example, a failure of a device as defined by a device level rule may lead to further rule checking using appropriate GDRs at the device's sub-device level. In the above cause-evidence-effect context, the invocation of a GDR is an effect, but the cause is a condition (such as a buffer overflow for a temporary register that triggered the GDR) and the supportive condition is the evidence of the overloaded data buffer.

FRs are insulated from the agent execution environment, and typically would be defined in such a way that they can be modified and reused. The diagnostic steps executed within the rules engines of the diagnostic agents consult FRs. The rules of this type represent rules that can be commonly defined across a family of products. They are less likely to change frequently as the products go through their life cycle of development, deployment, upgrades/downgrades and end-of-life. Because of their lesser interdependencies (between different product types with a family of products) they will be relied upon for consistency and often referred to at the individual operation or step level. Taking the example of a firewall device to illustrate, a family of stateful firewall filters at the IP (Internet Protocol) level have an operating system kernel resident driver. A diagnostic rule of the FR type could establish that a script should always check if the filter module is kernel resident and active if the firewall is not filtering incoming traffic.

The rules utilized in embodiments of the invention can also include combinatorial rules ("CR") that are based on two or more rules of the above four primary types. Two rules having similar primary types or differing primary types can form a CR by simple conjugation with predicates. A typical example of a combinatorial diagnostic rule could be represented as:

---

{if interface ge01 is down &server053 is up}
{then run command config0039}
where config0039 is defined as "ifconfig -a" in the rules repository.

---

In the above example, the outcome of two GDRs have been combined into a rule that tests if the gigabit interface ge01 is up and if the UNIX server server053 responds to ping, then conditionally indicates that the configuration command config0039 should be run. Also, deconstructing this example further, output of the command "ifconfig -a" is the effectual data, but "ge01 down" is the cause and "server053 up" is the evidence.

Further, derived rules ("DR") for every primary type of rule is possible, either as a result of explicit conjugation or using advanced knowledge of one or more of the resource elements under question. Derived DPR, AAR, GDR and FR can enhance flexibility with advanced predicates supplanting complex logic combinations. Typically, the design and encoding of derived rules as described herein would be undertaken by senior service engineers who are thoroughly knowledgeable about the resource elements and have tested advanced implications of deriving a rule from two or more primary rules for those elements.

Notably, the rules according to preferred embodiments of the invention are flexible as they are defined as software objects. Sometimes, the control and interface activities are resident in one rule. Control and interface activities must be separated into different objects so versions of controls and interfaces can be kept. For example, a small subset of rules for a network switch generated from DPRs, AAR, GDRs and FRs and may look like this:

NS21: configure ports 9, 10, 12, 14
NS26: monitor ports 12, 13, 14
NS29: connect port 9 to firewall input port 1

If the first two rules are considered as "control" related, the last one can be considered "interface" related and hence involves information pertaining to the entities external to the switch. The switch may change and the firewall may be redesigned to have multiple input ports. By encapsulating rule NS29 into a separate object, its variations over a period of time can be tracked. Rule NS26 is related to external monitoring although there are no external elements explicitly included in the rule. In this regard, it is likely that an AAR would be defined to make use of these FRs for the switch.

Automated diagnostic agent instances according to embodiments of the invention comprise software driven rules engines that operate on facts or metadata, such as telemetry and event information and data, according to these four primary rule types and those rules derived therefrom. The automated diagnostic agent instances therefore execute in accordance with the rules based on the facts and data found in the grid-based system, and then makes a determination about the grid. As described above, rules according to the present invention are defined as software objects which are stored in a repository, such as a database, of diagnostic metadata and rules (such as element 316 of FIG. 3). The automated diagnostic agent instances perform a series of operations that are defined by a particular agent script. As the operations of a particular script must vary depending upon the status and configuration of the particular grid-based system being diagnosed, each automated diagnostic agent instance bases its operations and decisions upon the rules, as defined by the appropriate diagnostic metadata and rules database for each grid-based system.

Referring now back to FIG. 5, there is depicted schematically the mechanism according to embodiments of the present invention by which automated diagnostic agent instances rely upon rules and metadata configured prior to execution by rule designers and system and service engineers to run automatically to either diagnose or provide a derivative list of the possible root cause(s) of faults, errors, or other events of interest, and in certain cases to take appropriate remedial actions. As shown in the drawing, a diagnostic rules designer 501 can utilize an application in the service interface, which application interacts with the diagnostic telemetry configurator 505 (also represented as element 314 in architecture 300 of FIG. 3), to design one or more diagnostic rules 510 for a particular grid-based system. These diagnostic rules are stored in the diagnostic metadata and rules database 520 for the grid-based system. At the same time, a system engineer or RSE can interact with the diagnostic telemetry configurator 505 to design one or more diagnostic rules 510 for the particular grid-based system to store metadata and other configuration information 511 in the diagnostic metadata and rules database 520. Rule designers, service engineers and RSEs do these configuration phase steps whenever a particular grid-based system needs to be initially configured for monitoring within the diagnostic architecture, framework, and agents according to the present invention, or whenever a previously configured grid-based system has been modified (e.g., a new logical server group, comprising newly installed hardware and/or existing hardware, is configured) in a manner that would affect diagnostic capabilities.

During the configuration phase of depicted FIG. 5, the rules metadata is compiled by the rules designers 502 into cause, evidence and effect meta elements using the Rules C-E-F Compiler 560. Rule designers send rule compiler configuration information 512 through the configurator 505 to configure the compiler 560. These various information flows into the compiler 560, which periodically reads then rules and configuration information stored in the database 520 and creates compiled cause, evidence, and effect ("C-E-F") meta-data 570 which is used to update the diagnostic metadata and rules database 520 (depicted as updated database 520').

At any point after a grid-based system has been initially configured by creating the diagnostic metadata and rules database 520 and the metadata has been compiled to create updated database 520', a user, such as a RSE 503, can utilize the execution phase elements of the diagnostic management application. As described above, a RSE user can view events produced by the grid-based system via the diagnostic management application and cause automated diagnostic agent instances to be executed within a desired grid-based system during this phase. When a event occurs for which the RSE believes an DL-agent or other automated diagnostic agent instance would be useful (such as a firewall error), as depicted in FIG. 5, the RSE sends a request 530 via the service interface to initiate that desired agent instance within the grid system. This request 530 is received by the diagnostic kernel 540 daemon in the grid-based system (also represented as element 318 in architecture 300 of FIG. 3), and the diagnostic kernel 540 thereafter spawns an automated diagnostic agent instance daemon that creates a diagnostic rules execution environment 550. This environment 550 allows the DIS process 551 and the various subprocess with which it interacts to operate in an execution workspace having all the necessary environment variables and appropriate rules. The DIS process 551 loads the state-transition rules and C-E-F metadata for the EBN into environment 550 that establish how the instance moves between the various diagnostic steps of the relevant diagnostic script for the DL-agent.

The DIS process 551 obtains the necessary rules information from the diagnostic metadata and rules database 520' at the beginning of a diagnostic agent instance, providing the automated diagnostic agent instance with a diagnostic execution environment 550 that is fully customized to the then current status and configuration of the particular grid-based system. The agent instance then proceeds to retrieve and analyze telemetry data from the data providers (element 322 of FIG. 3) and other systems of the grid and performs one or more of the three types of EBN analyses, including DLCI analysis, DLDI analysis, and DLI analysis. The DIS process 551 generally proceeds through the operations of the invoked script as dictated by AARs. Each time a step is completed, the DIS (or a suitable subprocess particular created for this task), in turn, selects and invokes the next appropriate AAR. When all operations and AARs have passed a return to the DIS, the process then signals completion of that instance of the DL-agent. The DIS process correlates all the generated data and uses the pre-complied rules cause-evidence-effects meta data to come out with a possible set of fault event records using a probability based algorithm. These records can thereafter be used by a RSE to make an informed decision regarding what remedial steps, if any, are needed to resolve the fault event.

Figure 6:
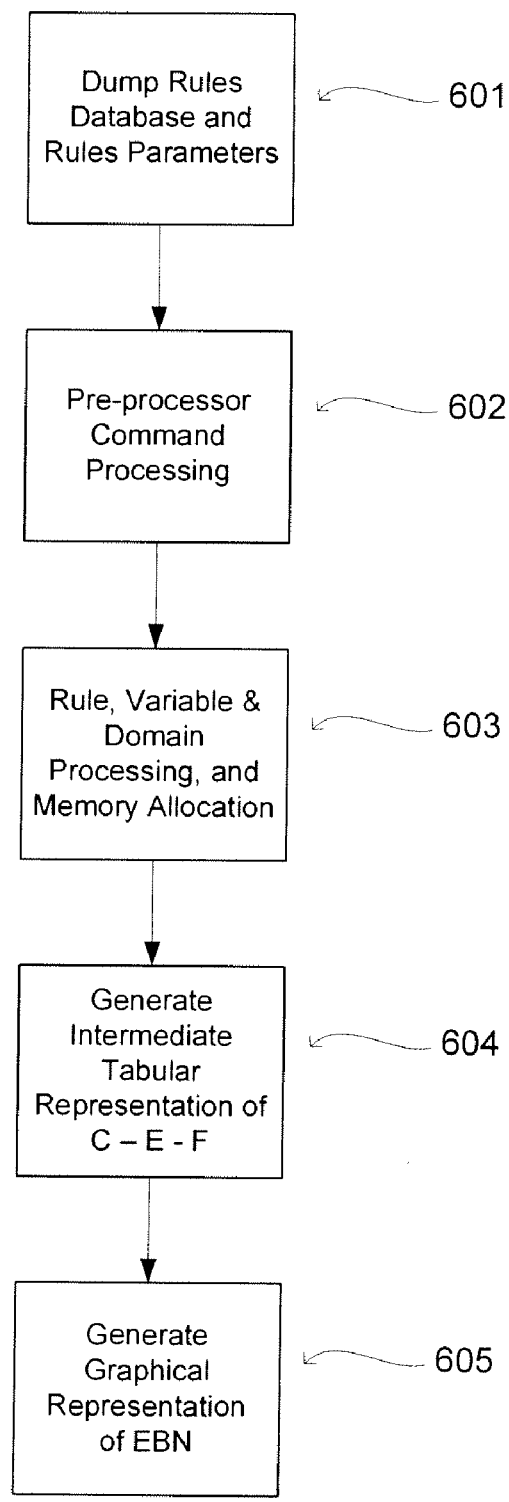
FIG. 6 is a flow diagram depicting the steps of an exemplary process for compiling cause, evidence, and effect metadata for an event belief network according to one embodiment of the present invention.

FIG. 6 is a flow diagram depicting the steps of an exemplary process 600 for compiling C-E-F metadata for an event belief network according to one embodiment of the present invention. The rules by themselves serve as only an intermediate representation of the information necessary for the building of the event belief network. To begin the compilation process 600, the rules database at step 601 is dumped in one or more flat files. A single rule may have several variables (forming a set) each with its own domain of values it can take. These variables are important for forming of the EBN, so the rules variables are similarly dumped separately at step 601.

Next, at step 602, the compiler's pre-processor command processing begins. For example, the flat files can be processed after a command is given, such as:

cef-dpr-aar-fr-gdr-cr<rules_db_dump_file> where "cef" is the name of the compiler to build the cause-evidence-effect pre-EBN output, the switches used in the command represent the types of rules to be dumped (for example the switch "-dpr" will parse the diagnostic process rules and dump them in the output file), and <rules_dump_file> is the flat file output of the target rules database produced at step 601.

Next, the C-E-F compiler's pre-processor and lexer/parser parses the flat file at step 602 according to the switches used in the command in the order of entry. The output thereafter feeds into the compiler's allocator at step 603, which allocates memory for tabular generation of cause, event, effect data, and also the variable structures for each of the nodes arising from the components of the rules. The nodal space size depends on the node's domain of values. An intermediate representation of the C-E-F metadata is typically first generated at step 604 in a tabular form for all the c-e-f nodes. Each node represents its domain of variable values it can assume (which is the pre-assigned value range) when the rules were initially constructed. For example, in the case of a combinatorial rule such as:

If interface ge01 is down and server053 is up, then run command config0039 the terms ge01 and server053 are two variables for the rule being parsed, and ge01 could be given values "up", "down", or "hung", which three values form its domain of values. Similarly, in the same rule server03 could have values "up" and "down" forming its domain.

Thereafter, at step 605, the process 600 concludes by generating a graphical EBN representation by feeding the intermediate data into a Bayesian reasoning analysis tool that is adapted to produce arc graphs from the tabular inputs. The graphs contain arcs connecting causes to effects (potentially along with initially assigned or dynamically recalculated weights for each arc, which weights are used to determine probabilities). A single effect may have multiple causal arcs pointing towards it. Such graphical representations are a useful visual tool for RSEs to reference, but are not utilized by the DL-agents. It is anticipated that in certain embodiments of the present invention that the graphical structure of the belief network can be visually represented with available tools of the DMA invoked from the front end for those who want to see and understand the inside of a specific EBN tree. Primarily, this will be a facility for use by RSEs to help them diagnose the belief network issues themselves, when needed.

The graphical EBN representation can be obtained, for example, by feeding the intermediate data in the flat file into a suitable Bayesian reasoning analysis tool having APIs to pass the parameters. In a "directed" graph, for example, produced by such tools, the displayed arcs in the graph will go from cause to effect. There are numerous software packages available for Bayesian reasoning. A particularly preferred one is the Bayesian Network Toolbox (BNT), a MATLAB toolbox that is freely available on the Internet. This toolbox supports dynamic Bayesian networks, decision networks, many exact and approximate inference algorithms, parameter estimation, and structure learning and can run on various platforms including Windows, Unix and Mac.

Whenever changes occur to the rules and metadata database, only the rule set that changed must be recompiled. This can be done by using only the corresponding switch, thus making use of an incremental compile functionality to save time in preprocessing and intermediate representation. The output files, for example, could be identified as cef.out as the intermediate representation file, and ebn.out as the EBN output. Such different output files are useful for process speed-up. For example, a RSE may want to stop at the cef.out file without proceeding to create the ebn.out for testing purposes. In such circumstances, a suitable switch such as "-noebn" could be used with the compile command. Alternatively, if the cef.out file is not required, it could also be bypassed by using a corresponding "-nocef" switch with the command.

In this manner, so long as the diagnostic metadata and rules databases are maintained to accurately reflect the status and configurations of their respective grid-based systems, a service engineer could initialize the same DL-agent whenever a particular event or scenario of events is encountered in any one of the grids with the confidence that the DL-agent in question will operate the same in each environment and will not have been broken by any changes or reconfigurations to any of the grid-based systems.

The probabilistic graphical models produced in process 600 are graphs in which nodes represent random variables, and the arcs (or lack thereof) represent conditional independence assumptions. Hence they provide a compact representation of joint probability distributions. Undirected graphical models, also called Markov random fields (MRFs), or Markov networks, have a simple definition of independence: two nodes (or sets of nodes) A and B are conditionally independent given a third node C if all paths between the nodes in A and B are separated by a node in C. By contrast, directed graphical models like Bayesian networks have a more complicated notion of independence that takes into account the directionality of the arcs.

With this understanding of the rules utilized by diagnostic agents in embodiments of the present invention, the neural network EBN logic utilized by DL-agents will now be described. As noted above, the DL-agents employ Bayesian reasoning. Bayesian reasoning is commonly utilized in modern computer networks for junk email filtering (i.e., a "spam filter"). Such Bayesian junk email filters operate by examining a set of e-mails that are known to be spam and a set of e-mails that are known to be legitimate and compares the content in both e-mails in order to build a database of words that will, according to probability, identify, or predict, future e-mails as being spam or not. Bayesian filters examine the words in a body of an e-mail, its header information and metadata, word pairs and phrases and even HTML code that can identify, for example, certain colors that can indicate a spam e-mail.

A primary advantage of Bayesian reasoning is that accuracy improves as the amount of data increases. Thus, a Bayesian junk email filter is able to learn—such filters can train themselves to identify new patterns of spam and can be adapted by the human user to adjust to the user's specific parameters for identifying spam. Bayesian filters also are advantageous because they take the whole context of a message into consideration. Thus, preferred neural networks employed by the DL-agents in producing derived lists according to embodiments of the present invention employ Bayesian reasoning, with initial probabilistic weights assigned during the initial C-E-F rule creation effort, but with those weights being automatically and continuously recalculated by the neural network as it "trains" itself using actual grid cause, evidence and effect data accumulated over time.

A belief network process 700 utilized according to preferred embodiments of the present invention to perform root cause probability analysis of failure events is depicted in FIG.

7. The rectangular elements as depicted therein are generally processing blocks and represent the implementation of computer software instructions or groups of instructions by an automated diagnostic agent instance. The diamond shaped element represents a specific decision block by the automated diagnostic agent instance (various "decisions" are made by the agent in each processing block step, but obviously not all are depicted in the drawing). The parallelogram elements depict inputs into the process. Alternatively, of course, the processing and decision blocks can represent steps performed by functionally equivalent circuits such as a digital signal processor circuit or an application specific integrated circuit (ASIC). The first step according to process 700, a priori, is to construct an adjacency matrix or the directed acyclic graph corresponding to the belief network. This construction entails numbering the nodes based on nodal dependencies in the event framework of the system in topological order. Parents before children and children before grandchildren. In the context of the grid event framework according to preferred embodiments as depicted and described above with respect to FIG. 2, (cause-effect) rule components of farm events are numbered before resource events, error events before farm events, etc. Process 700 is triggered by the receipt by a RSE of an event report at 701, such as a fault record.

The RSE at step 702 reviews the event report and then initiates an appropriate DL-agent. The command by the RSE user spawns a DL-agent instance, which includes a DIS and its related subprocesses at step 703. As shown in the drawing, the diagnostic agent considers appropriate ones of the AAR as inputs 703' as dictated by the appropriate script. The diagnostic agent therefore now knows which operations it needs to perform and in which order.

Next, at step 704, the automated diagnostic agent instance performs a check to see what the current status of the faulted device (in this particular example, a firewall). This check is performed in conjunction with the FR and GDR for the particular device as depicted by input element 704'. If the firewall device is indeed operating as expected (i.e., has a "good" status), the automated diagnostic agent instance proceeds to step 705 as depicted and obtains a list of requests, and then goes through a checklist of steps to determine why the device had a critical event at step 706. In the event that the firewall device is found to have a "bad" or undesirable status at step 704, the agent proceeds to the remainder of the process 700 as depicted.

The Bayesian inferential analysis utilizing the EBN workspace is performed by the DL-agent at step 707. The EBN, as noted above with respect to FIG. 6, is defined by the compiled C-E-F metadata 707', which metadata is kept updated by RSEs and rule designers. The node size assigned to the EBN is the size of the domains of each variable corresponding to the event in question, and domains in turn are the values those variables can take. The nodal size assigned to the EBN is the size of the domains of each variable and corresponds to the values that the nodes (e.g. devices, sub-systems, sub-sub-systems, etc.) in question can take. The number of nodes in turn corresponds to the target network or subnet for the farm in question. A network switch in a farm of the virtual data center under examination may have two assigned values in the domain; up and down. Another kind of switch or resource element may be assigned three assigned values—up, down, or hung. This compiled C-E-F metadata 707', including metadata from various different times/configurations of the grid, is loaded into the diagnostic execution workspace during step 707.

As noted above, DL-agents according to embodiments of the present invention can employ the Bayesian neural network to perform three different types of inferential analyses (alone, or in combination), namely causal ("top down") inference, diagnostic ("bottom up") inference, and inter-causal inference. As depicted, step 707 can comprise up to three sub-steps, which sub-steps involve the DIS performing, as requested by the RSE and dictated by the script in question, one or more of DLDI analysis at sub-step 707a, DLCI analysis at sub-step 707b, and/or DLI analysis at sub-step 707c.

Figure 7:
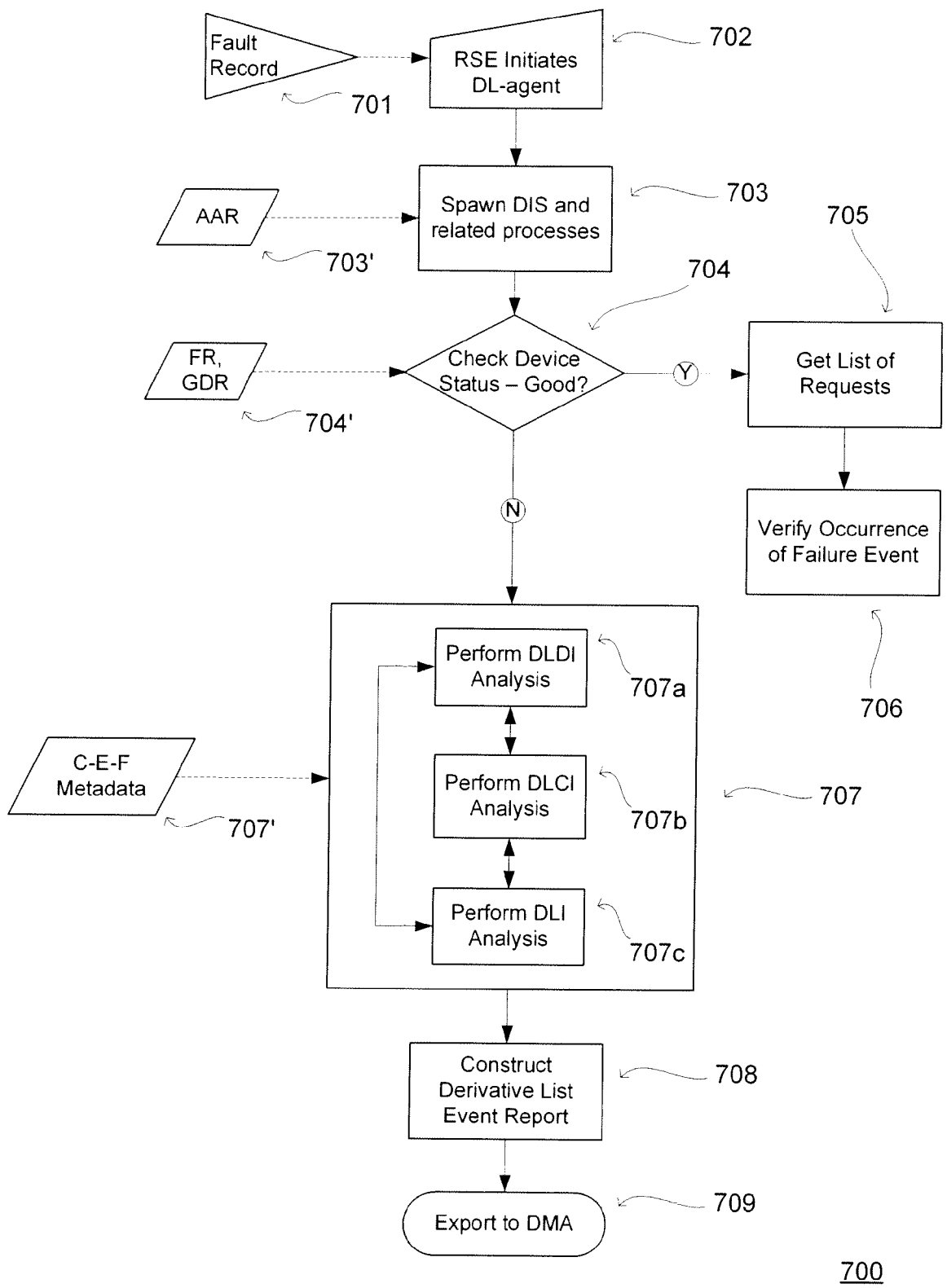
FIG. 7 is a flow diagram depicting the steps and inputs of an exemplary automated diagnostic agent instance according to one embodiment of the present invention.

A first one of the three types of analysis, derivative list diagnostic inference, or DLDI, analysis is depicted as being performed at sub-step 707b. While the analysis types can be performed independently and in any order (as indicated by the various double-sided arrows in FIG. 7), DLDI analysis is particularly useful as a first or initial "cut" by an RSE as it comprises a bottom-up inference from effects to causes. The effects are defined by the hierarchical grid event framework, such as that depicted above in FIG. 2. In the case of the preferred framework of FIG. 2, these effects include the errors in the error report, faults, other faults and chargeable events.

"Evidence" for a diagnostic query can be set up in DLCI analysis with the use of one of the data points from event, configuration, telemetry or historic data sets corresponding to the subject failed element, device, etc., of the resource in the farm. At this point, the probabilities with regard to the potential root causes can be calculated (or recalculated).

For DLCI analyses, data points in the form of "effects" are obtained from error report event(s) records, and these report records are mapped to faults and chargeable events stored in an event database (Edb). For instance, these fault events could be fw1 down (meaning no network traffic is passing through firewall fw1), or n1 down (meaning the network switch n1 is not connecting to the appropriate storage subsystem out of the storage rack when the database server requests it).

The RSE can enter appropriate fault data points selectively and use the Bayesian reasoning tool invoked from the DMA (and initiated from the DMA front-end by the RSE). The DIS, using the FMS maps the RSE-requested effect data point to the appropriate causes with associated probability indices, based on the effects and evidences gathered (with respect to that data point) via the diagnostic kernel from a rules database (Rdb). Thus, a set of potential root causes and associated base probabilities for those potential causes being related to the investigated event are thus assigned by the DIS using Bayesian reasoning.

At sub-step 707b, derivative list causal inference, or DLCI, analysis is performed. This DLCI analysis enables DL-agents to perform causal inference from known potential causes (if any) to fault effects. Known potential causes can come from several sources, including databases of rules data, event data, configuration analysis data, telemetry data, and historic data. The event data is primarily comprised of records for the faults generated in the system. The configuration data is the current configuration data, which data is cataloged as historical data whenever the current configuration is changed or updated. Thus, the historical data is generated based on cumulative changes to the baseline configuration which is also stored in the historical database. The various different types of data are collected by the diagnostic kernel and the four software subprocesses running in the background, FMS, DCAS, DTS and DAES, and categorize those in the context of this analysis.

Fault events data can be causal, evidential or effects type, and can be fault events identified by an error condition in the grid error report event or chargeable events (as described above with respect to FIG. 2). This data in the EBN is parsed from the reports and tabularized by the FMS (such as into an event database Edb), as well as presented to the DIS process for analysis (initiated by the RSE) when requested.

Configuration data (such as my be stored in a configuration database Cdb) and the historical data (such as may be stored in a historical database Hdb) represent the various configurations of the grid based networks systems, farms, and devices over a period of time. These two types of data can also be causal, evidential or effects type. This data is indexed by the device or subsystem. Multiple records are applicable and able to be referenced for inferential analysis based upon a single index. Whenever a specific target entity is investigated by a RSE using the DIS, these records are transparently invoked for conducting the required analysis by the DCAS. The configuration database, Cdb, could contain, for example, a base configuration with standard suggested device/subsystem components and parameters. Understandably, a few incorrect configuration records may exist in the Cdb at the start of a specific deployment of a data center farm (or at any given time) such as, for instance, the URL for a web server's web-page, the port number for a service, or the number of processes configured for a new kind of CPU introduced. In such cases of errors, the historical information in the Hdb will be of significant assistance in addition to the current configuration information in performing the DL diagnosing. Upon consulting the historical information, it could be concluded that the fault error logged in the error report resulting from an incorrect port may be of the type "Port not listening" on a service request (e.g., to ldap at port 389, https or ssl at port 443, or to smtp at port 25), while the URL fault could be more of a "Syntax" fault.

In preferred embodiments of the invention, the Hdb will have periodical full configuration capture, but on a fractional period basis it will capture differential information on all the configuration related entities. This includes, for example, the primary directories for a Unix type system: /etc/services, /etc/netconfig, /etc/net, /etc/security, and so on for the nodal (i.e. device or subsystem) level. In addition, FML, WML and MML types of differential information are captured as farm-level configuration, physical connectivity and monitoring policies change. Therefore, a Cdb defect traced back into Hdb by the DCAS and DAES will point out corresponding records that changed, if any, and DAES will present them for analysis to the DIS.

Similarly, telemetry data accessed by the DTS (and which may be stored by the grid in a telemetry database Tdb) can be causal, evidential or effects type. Primarily, this data involves the output of monitoring system and network performance, hardware status, and status of attached subsystems such as storage, as well as software status of the monitoring processes and subprocesses. Various sub-processes are deployed to gather all this information by the monitoring super-process in the data center. The telemetry information records are priority tagged at the time of capture, typically as "Normal", "Non-critical" (warning type) and "Critical" based on the telemetric threshold parameters set previously using the diagnostic telemetry configurator. There is a timestamp that is created for every telemetry record, and can be used as an alternate index for sorting records based on time using DTS.

One skilled in the art will readily appreciate that the differences between the different types of data within collected configuration, historical and telemetry data is not immediately discernable. In particular, the time of occurrence of the various data often determines how to classify data. Relatively standard telemetry data that is gathered automatically by DTS, for example, could become evidential data indicating a systematic fault depending upon the time of its collection (after the fault or at the time of fault vs. before the fault).

Therefore, when a fault event is experienced, DL-agents will initially treat all data as evidential data and relate it to the fault event data using DIS. From the fault event information and corresponding evidential data from the rules compilation, the agents trace the correlated evidential data from the configuration data, historical data, and telemetry data. A set of base probabilities to causes are thus assigned by the DIS using Bayesian reasoning, such as according to known methods using available reasoning tools, such as BNT.

The process 700 performs derivative list intercausal, or DLI, analysis as depicted at sub-step 707c. DLI analysis is adapted to determine the likelihood that a given causal node will have a particular value given the value of another node. This be useful as it enables RSEs to learn more about the relationships between fault causes, which can help decision making in the trouble shooting process. For example, it may be easier to determine address one cause over another. Depending upon the customer's data center environment status, one cause identified may be simpler to be attacked and fixed, helping to relieve impending business stress.

Figure 8:
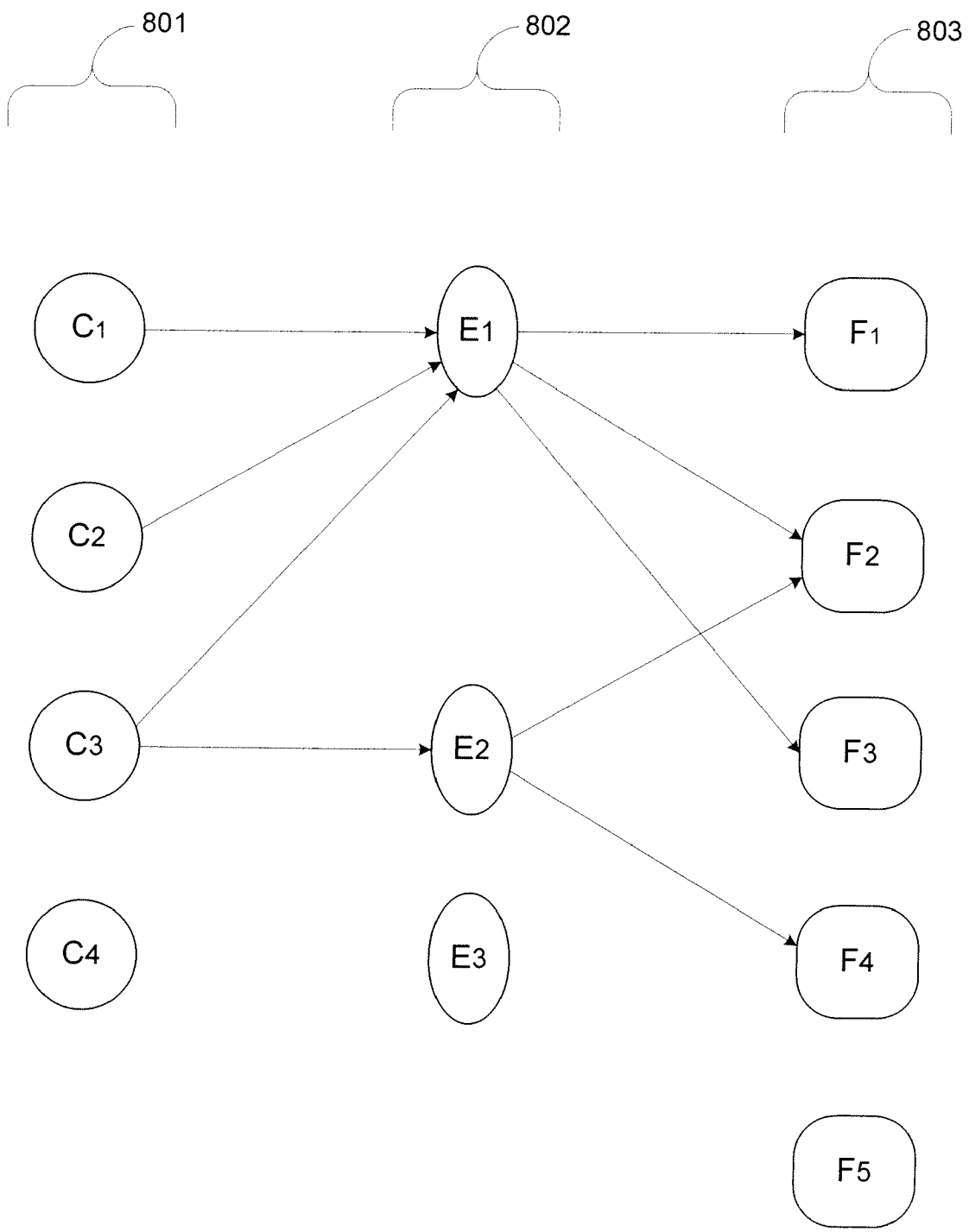
FIG. 8 is a schematic diagram representing how the automated diagnostic agents according to embodiments of the invention perform derivative list intercausal analysis by associating various causes, evidences, and effects.

Turning now to FIG. 8, there is depicted schematically how a DL-agent associates various causes, evidences, and effects when performing intercausal analysis according to embodiments of the invention. In FIG. 8, C1, C2, C3, and C4 depict causes (generally identified by reference numeral 801), E1, E2, and E3 are evidences (generally 802), and F1, F2, F3, F4, and F5 are effects (generally 803) that are compiled from the metadata and rules database. As shown, causes 801 C1, C2, and C3 are all related to evidence E1. Thus, a single evidence can be related to multiple causes.

Additionally, it will be noted that cause C3 also relates to evidence E2, showing that a single cause can give rise to multiple evidences. Finally, evidence E1 is related to three effects, F1, F2, and F3, while evidence E2 is also related to effect F2, but additionally to effect F4. The map of associations depicted in FIG. 8 is constructed by a DL-agent in embodiments such that effects and evidences may be linked backwards to potential root causes.

Returning again to FIG. 7, the three different types of analyses at step 707 are used to construct a derivative list event at step 708. The DL event is thereafter exported to the diagnostic management application, or DMA, at step 709 where it can be communicated to the RSE (such as via the front end as described above) and used for further diagnostic purposes.

The derived list event produced according to embodiments of the invention contains an identification of probable isolated faults, each identified fault record that is contained in the derived list is assigned a probability index (percentage) designed to assist a remote service engineer in making a decision on further actions to take. The probability index represents a "confidence level" for deriving a conclusion that the isolated fault is a root cause for the particular fault event being investigated.

Notably, if the evidence of a related fault is added and probabilities are recomputed, a further refinement is possible in determining the probabilities of fault records. In this manner, the DL event produced in step 707 can be refined as more information becomes available. For example, for a farm level event, a related resource added to a predicate set within the belief network, such as storage subsystem failure or data center control level fault, could make a difference for the better. With this added step, the probability is expected to reach to a more realistic level providing potential explanations for the fault with more detailed and better justifications. It is important to note that the evidence collection is based on the DIS finding data points in the error report events, and tracing them back into various databases, such as the rules database (Rdb), Edb, Cdb, Tdb and Hdb, with the help of their respective daemons (e.g., the diagnostic kernel, FMS, DCAS, DTS and DAES), and bringing appropriate evidence points back for DLI analysis.

Thus, referring again to FIG. 8, F4 is the result of cause C3 with evidence E2. If C3 and C4 both exist, then the RSE can check the effect on F4 with evidence E2 and E3 to see if changes are experienced as expected. Such intercausal analytic information is therefore of significant value.

Figure 9:
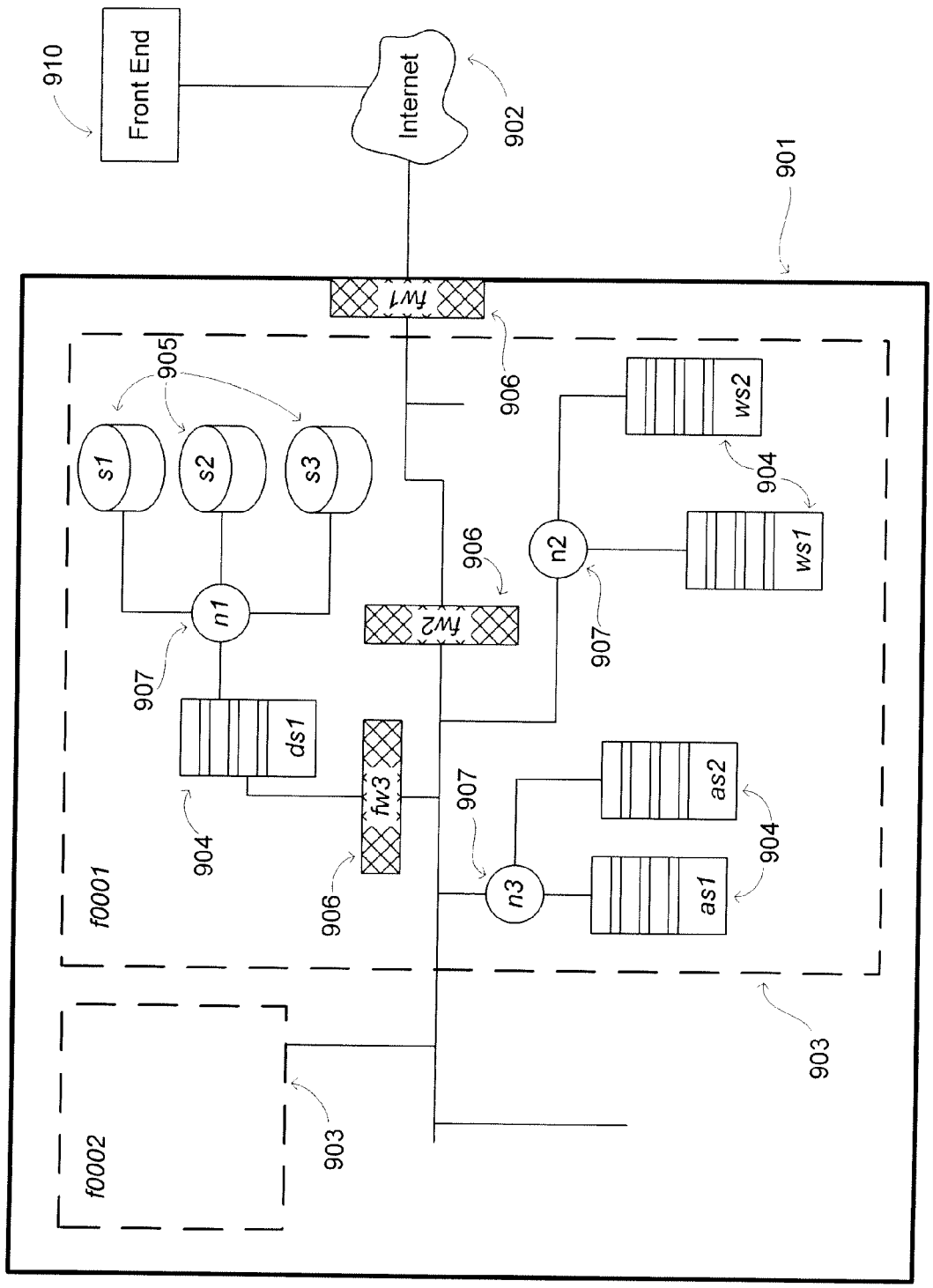
FIG. 9 is a schematic diagram depicting an exemplary grid-based computing system that is employing remote diagnosing architecture according to embodiments of the present invention.

Depicted schematically in FIG. 9 is an example of a grid-based computing system that is employing remote diagnosing architecture according to embodiments of the present invention. The depicted computing system has a grid-based data center 901 which has defined therein various farms 903. The farms 903 and data center 901 in turn contain various servers 904 (such as web servers, application servers, and database servers) and storage devices 905 in communication via various elements, including firewalls 906 and network switches 907. The depicted exemplary farms 903 labeled f0002 and f0001 (although data center 901 can contain any number of undepicted farms, devices, and elements) are accessed via the front end 910 of the DMA by a RSE securely over the Internet 902. Customer data stored remotely by the enterprise in this data center spans many storage subsystems, such as storage devices s1, s2 and s3 storage devices in the farm with farm ID f0001. The network switch n1 connects to the appropriate storage device per requests from the database server ds1. There are also two other network switches (n2 and n3) to select or connect to the appropriate web server, ws1 or ws2, or application server, as1 or as2, respectively. Various firewalls protect various portions of the data center. The boundary firewall for the data center is represented by fw1, and fw2 and fw3 firewalls protect the subnets in the farm f0001.

The example of FIG. 9 will now be used to describe through specific examples the three kinds of analysis that can be performed in reference to the generated EBN for the data center components, namely, DLCI, DLDI, and DLI analysis. The RSE has an option of choosing any one or more kinds of analysis from the user interface depending the diagnostic situation the target farm or the device or the subsystem is in.

The example cases are described in the below Table 2 with reference to the various elements of system 900 depicted in FIG. 9.

TABLE 2

| Cases | CEF | | |
|---|---|---|---|
| | C (Causes) | E (Evidences) | F (Effects) |
| Case 1 | s1 down ($c_1$) | Fw2 up ($e_1$) | $f_1$:<br>error report; n1 down<br>n1 restart |
| Case 2 | n3 up ($c_2$) | As2 down ($e_2$)<br>Fw1 up ($e_{2'}$) | $f_2$:<br>error report<br>$f_{2'}$:<br>ping fw2 and<br>ping as2 |

TABLE 2-continued

| Cases | CEF | | |
|---|---|---|---|
| | C (Causes) | E (Evidences) | F (Effects) |
| Case 3 | as2 down ($c_3$) | Fw3 up ($e_3$)<br>n3 up ($e_{3'}$)<br>fw1 up and<br>fw2 up ($e_{3''}$) | $f_3$:<br>error report;<br>as2 unreachable<br>$f_{3'}$:<br>ping fw2 and ping fw1<br>$f_{3''}$:<br>as2 boot using boot process<br>BP2 required |

For Case 1 in Table 2, if storage unit s1 is down, and firewall fw2 is found to be up, then switch n1 is also down, as dictated by the effect $f_1$. Thus, switch n1 requires a restart. The need for this restart could be dictated by an appropriate AAR.

Looking at the cause-evidence-effect relationship from the above example, there is cause $c_1$ with evidence $e_1$ that produces effect $f_1$, which can be represented as:

$$c_1 \to e_1 \to f_1$$

For Case 2 in Table 2, the C-E-F rules metadata dictate that if switch n3 is up, and application server as2 is found to be down while firewall fw1 is up, then effect $f_2$ is found. Looking at Case 2 further cause $c_2$ with evidence $e_2$ giving the effect $f_2$, but when evidence $e_{2'}$ is added a different possible effect is $f_{2'}$ is dictated in the form of "ping fw2 and ping as2a." This can be represented as:

$$c_2 \to e_2 \to f_2$$

$$\to e_{2'} \to f_{2'}$$

Finally, when $e_3$, and are added, the effect seen is $f_{3''}$ in Case 3, which is represented as follows: According to Case 3, if as2 is down, and fw3 is up, then an error report that as2 is unreachable would be an effect. When n3 is up (i.e. evidence $e_{3'}$), the rules dictate that a ping of fw2 and fw1 is performed. Finally, when it is found that fw2 and fw1 are up (as evidence $e_{3''}$), as2 down is confirmed. Accordingly, an appropriate DPR could thereafter dictate that application server as2 should be booted using booting procedure BP2, the appropriate procedure for that particular machine type. Therefore, when $e_3$, $e_{3'}$ and $e_{3''}$, are added, the effect seen is $f_{3''}$ in Case 3, which can be represented as follows:

$$c_3 \to e_3 \to f_3$$

$$\to e_{3'} \to f_{3'}$$

$$\to e_{3''} \to f_{3''}$$

The records for presentation to the RSE will be sent by the DIS via DMA to the front-end. In a situation where as2 is down, and f3 and n3 are up, and as2 being unreachable is the effect as found in the error report event logs as a (starting) data point. An example of a DL event record to be presented by the DIS to the RSE after performing a DLI analysis can be in the form as depicted in Table 3 below.

TABLE 3

| Type of Analysis Initiated | Farm ID | Targeted Network or Subnet | Data Point in G-error Report | Evidence from Retrieved Data | Suspect Target Device or Subsystem | Probability of Failure |
|---|---|---|---|---|---|---|
| DLI-003 | f0001 | 10.5.7.24 | as2 unreachable | fw3 up | as2 | 80.00% |
|  |  |  |  | n3 up | fw3 | 18.00% |
|  |  |  |  | fw1 up | n3 | 2.00% |
| DLI-002 | f0001 | 10.5.7.24 | as2 unreachable | fw3 up | as2 | 65.00% |
|  |  |  |  | n3 up | fw3 | 35.00% |
| DLI-003 | f0001 | 10.5.7.24 | as2 unreachable | fw3 up | as2 | 80.00% |
|  |  |  |  | n3 up | fw3 | 18.00% |
|  |  |  |  | fw1 up | n3 | 2.00% |

While the above detailed description has focused on the implementation of automated diagnostic agent instances utilizing software, one of ordinary skill in the art will readily appreciate that the process steps and decisions may be alternatively performed by functionally equivalent circuits such as a digital signal processor circuit or an application specific integrated circuit (ASIC). The process flows described above do not describe the syntax of any particular programming language, and the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The RSE is offered these three types of analytical approaches as described above, and, advantageously, can combine bottom up (effects to causes) and top down (causes to effects) analysis to get an overall picture regarding the status of the grid. Utilizing the present invention, the RSE can collect various clues in incremental fashion, in the form of probabilistic failures in complex situations, and then make an informed decision based upon the various clues.

In particular, for example, the RSE can first initiate a DL-agent to perform DLDI analysis to perform bottom-up analysis. This bottom up analysis would start with the error event as one or more effects and then calculate using the EBN a few suspect causes from those known effects. These suspect causes would produce a DL that identifies the suspect causes and provides a probabilistic estimate from the EBN for each suspect cause where the estimate represents the likelihood that the particular cause is the root cause of the failure event.

Given this DL output from the DLDI analysis, the RSE could initiate one or more subsequent DL-agents to perform DLCI analysis to work back to a probabilistic list of potential effects from one or more of the potential root causes identified in the DLDI analysis. Understandably, this top-down analysis will produce a list of potential effects that is useful for the RSE to produce a list of effects that are likely to occur simultaneously (i.e., "co-symptoms" of a systemic problem). Additionally, from the potential root causes identified by DLDI analysis, the RSE can utilize DL-agents to perform DLI analysis using evidential data, as appropriate to further develop additional clues regarding problems within the grid.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system (e.g., within random access memory or RAM). It is also to be understood that other embodiments of the invention can provide the applications operating within the processor as the processes. While not shown in this example, those skilled in the art will understand that the computer system may include other processes and/or software and hardware subsystems, such as an operating system, which have been left out of this illustration for ease of description of the invention.

Furthermore, it will be appreciated by one skilled in the art that the logical constructs and processes for creating and using derived lists according to embodiments of the invention may be applied to other fields requiring deductive and inferential reasoning. As such, the embodiments of the invention may be applied in medical diagnosis, where, for example, one may wish to infer the presence of one or more diseases based on a given set of symptoms. Likewise, decision support frameworks in a battlefield contexts apply similar logic. One may wish to infer various types of information, such as the type of enemy units, enemy formation, movement, imminent or long-term actions, where and when such actions may occur, an appropriate response, and possible consequences. Also, in marketing and business applications, for example, the present invention can find applications in recommending products a consumer would like/dislike based on some small list of the user's known likes/dislikes and based on the leveraging of a database of known preferences and interdependencies of various factors for consumers.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for producing a derived list of suspect root causes for fault events in a grid-based computing system, the method comprising:
    establishing a rules database containing rules describing said grid-based computing system;
    establishing one or more agent scripts each adapted to identify potential causes for particular fault events that may occur in said computing system, each said agent script referencing said rules in said database to analyze metadata produced by said computing system;
    receiving an indication of a fault event after it occurs in said computing system; and
    initiating an automated diagnostic agent process instance in said computing system according to one of said agent scripts associated with said occurred fault event, said automated diagnostic agent instance process comprising a rules-based engine that establishes an event belief network that applies inferential logic to associate root causes with fault events by logic performing one or more analyses to construct a derivative list event according to said rules; and
    with said automated diagnostic agent process instance, generating and outputting a derived list from the derivative list events that contains an identification of probable isolated faults, wherein each of said probable isolated faults has a probability index assigned thereto and wherein said probability index represents a confidence level for deriving a conclusion that the associated fault is a root cause for an investigated fault event.

2. The method of claim 1, wherein said analyses perform Bayesian inferential logic of types selected from the group consisting of derivative list diagnostic inference analysis, derivative list causal inference analysis, and derivative list intercausal analysis.

3. The method of claim 2, further comprising initiating two or more automated diagnostic agent process instances in succession, said two or more instances utilizing different ones of said types of said analyses whereby the derived list produced by a first of said two or more instances is used as an input for subsequent ones of said two or more instances.

4. The method of claim 2, wherein said derived list causal inference analysis performed by said rules engine identifies potential fault effects from known causes, and provides probabilities for said potential faults.

5. The method of claim 2, wherein said derived list diagnostic inference analysis performed by said rules engine identifies potential root causes for known effects, said effects being selected from the group consisting of error events, fault events, and chargeable events.

6. The method of claim 2, wherein said derived list intercausal analysis performed by said rules engine analyzes the probability of one potential cause having a given value given a known value for another cause.

7. The method of claim 1, further comprising compiling said rules regularly into cause, evidence, and effects ("C-E-F") metadata and storing said C-E-F metadata, said C-E-F metadata representing a-then current configuration of said grid-based computing system, and wherein one or more versions of said C-E-F metadata are used by said engine to determine probabilities for said analyses.

8. The method of claim 1, wherein said and rules being of types including:
    i) diagnostic process rules defining procedures for diagnosing resources in said computing system;
    ii) agent action rules relating to transitioning of steps for diagnosing said computing system;
    iii) granular diagnostic rules defining procedures for diagnosing finer components of said resources; and
    iv) foundation rules defining characteristics that apply to a particular family of resources.

9. The method of claim 1, wherein said rules engine spawns a fault management service subprocess to collect event data relevant to said investigated fault event.

10. The method of claim 1, wherein said rules engine spawns a diagnostic configuration analysis service subprocess to collect configuration analysis data relevant to said investigated fault event.

11. The method of claim 1, wherein said rules engine spawns a diagnostic telemetry service subprocess to collect telemetry data relevant to said investigated fault event.

12. The method of claim 1, wherein said rules engine communicates with a diagnostic archive explorer service subprocess of a diagnostic management application of said grid based system, said diagnostic archive explorer subprocess collecting historic data relevant to said investigated fault event.

13. A computer readable medium having computer readable code thereon for producing a derived list of suspect root causes for fault events in a grid-based computing system, the medium comprising:
    instructions for establishing a database containing rules describing said grid-based computing system according to causes, evidences, and effects;
    one or more agent scripts each adapted to identify potential causes for particular fault events that may occur in said computing system, each said agent script referencing said rules in said database to analyze metadata produced by said computing system;
    instructions for receiving an indication of a fault event after it occurs in said computing system and displaying said fault to a user; and
    instructions enabling said user to initiate an automated diagnostic agent process instance in said computing system according to one of said agent scripts associated with said occurred fault event, said automated diagnostic agent instance process comprising a rules-based engine that establishes an event belief network that applies inferential logic to associate root causes with fault events by performing one or more analyses to construct a derivative list event according to said rules; and
    instructions causing said automated diagnostic agent process instance to generate and report a derived list from the derivative list event that contains an identification of probable isolated faults with each probable fault having a probability index assigned thereto and wherein said probability index represents a confidence level for deriving a conclusion that the associated fault is a root cause for an fault event,
    wherein said analyses perform Bayesian inferential logic of types selected from the group consisting of derivative list diagnostic inference analysis, derivative list causal inference analysis, and derivative list intercausal analysis.

14. The computer readable medium of claim 13, wherein said probability index represents a confidence level for deriving a conclusion that the associated fault is a root cause for an investigated fault event.

15. The computer readable medium of claim 13, further comprising instructions for recalculating probabilistic weights associated with said causes, evidences, and effects as data concerning said grid-based computing system is accumulated.

16. A grid-based computing system adapted to provide partially automated diagnosis of fault events by producing a derived list of suspect root causes for said fault events, the computing system comprising:
a memory;
a processor;
a persistent data store;
a communications interface; and
an electronic interconnection mechanism coupling the memory, the processor, the persistent data store, and the communications interface;
wherein said persistent data store contains a database storing rules describing said grid-based computing system according to causes, evidences, and effects, and said persistent data store further contains one or more agent scripts each adapted to identify potential causes for particular fault events that may occur in said computing system, each said agent script referencing said rules in said database to analyze metadata from said computing system; and
wherein the memory is encoded with an application that when performed on the processor, provides a diagnostic process for processing information, the diagnostic process operating according to one of said agent scripts and causing the computing system to perform the operations of:
receiving an indication of a fault event after it occurs in said computing system; and
initiating an automated diagnostic agent process instances in said computing system according to one of said agent scripts associated with said occurred fault event, said automated diagnostic agent instance process comprising a rules-based engine that establishes an event belief network that applies inferential logic to associate root causes with fault events by performing one or more analyses to construct a derivative list event according to said rules; and
with said automated diagnostic agent process instance, generating and outputting a derived list from the derivative list events that contains an identification of probable isolated faults with each probable fault having a probability index assigned thereto, said probability index representing a confidence level for deriving a conclusion that the associated fault is a root cause for an investigated fault event.

17. The grid-based computing system of claim 16, wherein said analyses perform Bayesian inferential logic of types selected from the group consisting of derivative list diagnostic inference analysis, derivative list causal inference analysis, and derivative list intercausal analysis.

18. The grid-based computing system of claim 17, wherein said operations encoded in said memory further causes said computing system to initiate two or more automated diagnostic agent process instances in succession, said two or more instances utilizing different types of said analyses whereby the derived list produced by a first of said two or more instances is used as inputs for subsequent ones of said two or more instances.

* * * * *

UNITED STATES PATENT AND TRADEMARK OFFICE
CERTIFICATE OF CORRECTION

| | | |
|---|---|---|
| PATENT NO. | : 7,536,370 B2 | Page 1 of 1 |
| APPLICATION NO. | : 11/427298 | |
| DATED | : May 19, 2009 | |
| INVENTOR(S) | : Masurkar | |

It is certified that error appears in the above-identified patent and that said Letters Patent is hereby corrected as shown below:

Column 34, line 58, after "an", insert --investigated--.

Signed and Sealed this

Thirtieth Day of June, 2009

JOHN DOLL
*Acting Director of the United States Patent and Trademark Office*